(12) United States Patent
Spring et al.

(10) Patent No.: US 10,964,108 B2
(45) Date of Patent: *Mar. 30, 2021

(54) AUGMENTATION OF CAPTURED 3D SCENES WITH CONTEXTUAL INFORMATION

(71) Applicant: DotProduct LLC, Boston, MA (US)

(72) Inventors: Rafael Spring, Wiesbaden (DE); Thomas Greaves, North Andover, MA (US)

(73) Assignee: DotProduct LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,197

(22) Filed: Jun. 12, 2020

(65) Prior Publication Data

US 2020/0312026 A1    Oct. 1, 2020

Related U.S. Application Data

(63) Continuation of application No. 15/980,913, filed on May 16, 2018, now Pat. No. 10,699,481.

(60) Provisional application No. 62/507,494, filed on May 17, 2017.

(51) Int. Cl.
| | |
|---|---|
| G06T 19/00 | (2011.01) |
| G06T 7/70 | (2017.01) |
| G06F 3/0484 | (2013.01) |
| G06T 15/20 | (2011.01) |
| G06F 40/169 | (2020.01) |

(52) U.S. Cl.
CPC .......... G06T 19/00 (2013.01); G06F 3/04845 (2013.01); G06T 7/70 (2017.01); G06T 15/205 (2013.01); G06F 40/169 (2020.01); G06T 2219/004 (2013.01)

(58) Field of Classification Search
CPC ......... G06T 7/70; G06T 15/205; G06T 19/00; G06T 2219/004; G06F 3/04845; G06F 17/241; G06F 40/169
See application file for complete search history.

(56) References Cited

U.S. PATENT DOCUMENTS

| | | |
|---|---|---|
| 9,615,140 B1 | 4/2017 | Malinowski |
| 2015/0264416 A1 | 9/2015 | Heinz et al. |
| 2018/0144547 A1 | 5/2018 | Shakib et al. |

*Primary Examiner* — Ke Xiao
*Assistant Examiner* — Jed-Justin Imperial

(57) ABSTRACT

Augmentation of captured 3D scenes with contextual information is disclosed. A 3D capture device is used to capture a plurality of 3D images at a first resolution. A component on a mobile computing device is used to capture at least one piece of contextual information that includes a capture location data and a pose data. The mobile computing device receives, the plurality of 3D images from the 3D capture device, and renders the plurality of 3D images into a 3D model. In addition, the at least one piece of contextual information is embedded into a correct location in the 3D model. A user interactive version of the 3D model including the embedded at least one piece of contextual information is then displayed.

18 Claims, 15 Drawing Sheets

AUGMENTATION OF CAPTURED 3D SCENES WITH CONTEXTUAL INFORMATION

CROSS-REFERENCE TO RELATED APPLICATIONS

This application is a continuation of U.S. patent application Ser. No. 15/980,913, filed May 16, 2018, entitled "Augmentation Of Captured 3D Scenes With Contextual Information" by Rafael Spring et al., assigned to the assignee of the present application, which is herein incorporated by reference in its entirety.

U.S. patent application Ser. No. 15/980,913 claims benefit of U.S. Provisional Patent Application Ser. No. 62/507,494, filed May 17, 2017, entitled "User-Friendly Augmentation Of Captured 3D Scenes With Contextual Information" by Rafael Spring, assigned to the assignee of the present application, which is herein incorporated by reference in its entirety.

FIELD OF THE INVENTION

Embodiments of the invention generally relate to three-dimensional data capture of scenes.

BACKGROUND

In many industries, 2D pictures are taken as a form of documentation of a scene, object, or asset. Often 100s of pictures will be taken, for example at a crime scene, accident scene, or a construction site, or an industrial facility or ship that needs repairs or renovations or validation that it has been constructed according to the design models. However, it is very difficult for users to understand where the pictures were taken and from what viewpoint. This can severely limit the usefulness of 2D pictures in these applications.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
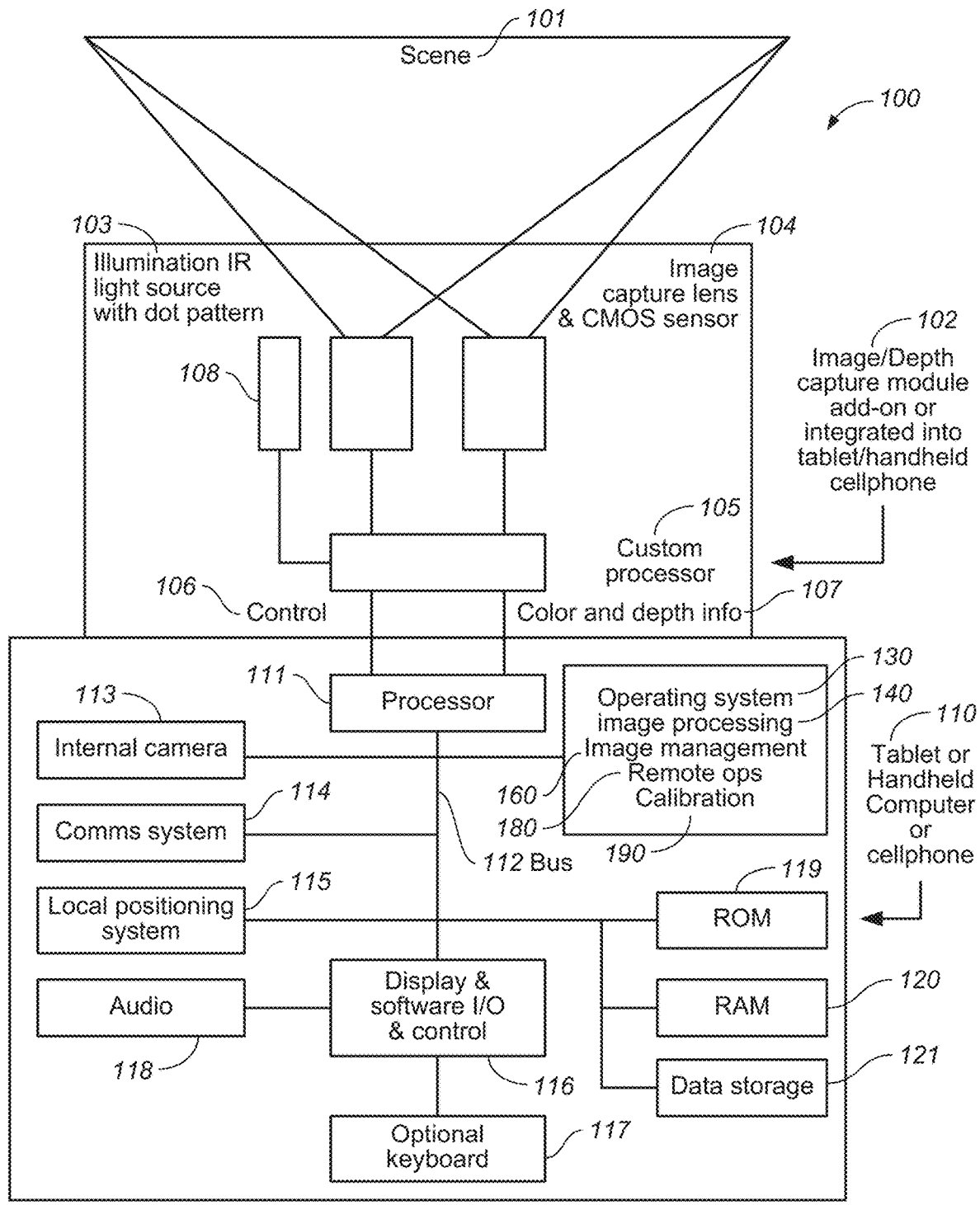
FIG. 1 is a block diagram of a handheld portable optical scanning system, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting", "deploying" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

Importantly, the embodiments of the present invention, as will be described below, provide a process for capturing additional contextual information for objects or features of interest directly while also capturing 3D data using an interface displayed on a hand-held mobile device. In so doing, the user sees a real-time visualization of the data they are capturing, as a visualization of a 3D model building up as the data capturing progresses. In addition, in one embodiment, the additional contextual information is embedded into the 3D model and displayed within the 3D model on the mobile device display as an interactive display. This approach differs significantly from the conventional processes used for 3D scene recording, rendering, processing, and post-processing user interaction.

The capturing and modeling of an environment in a 3D scene is important for modeling power utility rooms, vessel compartments, etc. For example, a location such as a mechanical room with pumps, generators, electric control boxes, etc. where there is no present diagram, or floor plan or CAD model showing what is actually in the room, any modifications made to things in the room, updates, etc.

3D scene capture is also valuable to determine an as built condition versus the as designed version of a building, room, etc. It can also be valuable in providing an actual layout of buildings, rooms, etc. For example, as one or more rooms are updated the information changes. If a new design is being considered, a 3D model of the actual space would be important for determining material amounts, costs, what would fit and would not fit, etc.

The addition of contextual information into the 3D model is additionally valuable in areas such as a crime scene, where, when photos are taken, it can be difficult if not impossible to manage the organization of the photos (e.g., the where, the size, the direction, etc.) to make sure the layout of the photos is correct. By augmenting the captured 3D scenes with contextual information, the photos taken at the scene are tagged as being in a specific location and then are stitched into the scene in the appropriate location with the appropriate pose data. Moreover, the conglomeration can resolving ambiguities about which witnesses can see what from where and when, which can require robust 3D geometric context not obtainable with 2D images only. In one embodiment, pose data includes a point in 3D space (e.g. XYZ values) and a directional component in 3D space (e.g. rotation matrix or quaternion) for the contextual information at a time the at least one piece of contextual information was captured (e.g., direction, angle, pitch, yaw, etc.). In another embodiment, pose data includes a reference frame in the 3D scene and a pose (3D position and rotation) relative to the reference frame's pose.

In general, each pixel in the 3D image includes a depth value such that real scale can be defined in the 3D scene that is modeled. The depth value could utilize metric measurements, English measurements, or the like. As such, embodiments described herein are also valuable for obtaining measurement information in a 3D model of congested spaces, spaces that include items that are too complex to measure by hand, spaces that do not have enough room to get all the measurements, spaces with numerous layers of pipes, cords, wires, etc. that are not easily separated, and the like.

In one embodiment, the contextual information can be 2D images that are higher resolution than the 3D images being captured, audio information, a higher resolution video snippet, etc. In one embodiment, the contextual information is added to the 3D model and represented as an icon or link within the 3D scene. Moreover, the icon or link can be selected by a user interacting with the 3D model to provide the contextual information to the user. For example, the contextual information captured could be a tag, an easier interface, a clearer view, an area of interest, an audio capture, a higher resolution video capture (such as a view out of a window or door, people in the crowd, a statement, etc.), or the like as described in further detail herein.

In conventional approaches, the 3D model/point cloud is obtained as part of a first step and then a second post processing step is performed on a different more powerful computer which loads up the 3D model (or parts of it) into point cloud processing software which will perform fully-automatic conversion of the point cloud into geometric primitives or allows a user to hand-select certain sections of the point cloud and let the software perform primitive detection/conversion on those selected parts (semi-automatic). Both fully-automatic and semi-automatic approaches are time-consuming and challenging to the normal user. Such conventional approaches are error prone, tedious, time-consuming, and oftentimes include significant delay between when the data is captured and when it is ready to be presented.

Instead, the present embodiments, as will be described and explained below in detail, provide a previously unknown procedure for generating a 3D model, while also allowing the embedding of any captured contextual information (e.g., a 2D higher resolution image, a higher resolution video snippet, an audio file, or the like) into the 3D model, at the time of capture or afterwards. By embedding contextual information in a 3D model and giving the viewer of the 3D model the ability to seamlessly "fly" between different embedded contextual information in the scene, one embodiment solves the problem of regular 2D pictures lacking 3D visual context. Instead, the user is able to get a spatial understanding of where the contextual information was obtained and how they relate to each other in 3D, which extends well beyond what was previously capable.

As will be described in detail, the various embodiments of the present invention do not merely implement conventional processes for capturing and building a 3D scene. Instead, the various embodiments of the present invention, in part, provide a previously unknown procedure for incorporating additional contextual information at a higher resolution into the 3D scene. Hence, embodiments of the present invention provide a novel process for 3D modeling which is necessarily rooted in computer technology to overcome a problem specifically arising in the realm of real-time 3D capturing and modeling.

Moreover, the embodiments do not recite a mathematical algorithm; they do not recite a fundamental economic or longstanding commercial practice; and they do not merely recite the performance of some practice known from the pre-Internet world along with the requirement to perform it on the Internet or on a computer. Instead, the embodiments are necessarily rooted in 3D modeling technology in order to overcome problems specifically arising in the realm thereof.

Operation

With reference now to FIG. 1, a block diagram of a handheld portable optical scanning system 100 is shown in accordance with an embodiment. System 100 includes a mobile device 110. Although FIG. 1 shows a handheld portable optical scanning system of structured-IR-light-type, it should be appreciated that the 3D capture device could be any of a plurality of possible handheld portable scanning systems. The use of the system shown in FIG. 1 is provided as one example option.

In general, mobile device 110 may be a mobile phone, a smart phone, a tablet, a laptop, a smart watch, a piece of smart jewelry, smart glasses, and other user portable and/or wearable computing devices. In one embodiment, mobile device 110 has wireless connectivity. That is, mobile device 110 is capable of broadcasting and receiving via at least one network, such as, but not limited to, WiFi, Cellular, Bluetooth, NFC, and the like. In one embodiment, mobile device 110 will have a positioning determining system such as global positioning system (GPS) or the like. In another embodiment, mobile device 110 is able to determine a location within a given radius, such as the broadcast range of a beacon, WiFi hotspot, overlapped area covered by a plurality of mobile telephone signal providers, or some combination thereof. Further, the location determined by mobile device 110 could be useful even at differing levels of accuracy. For example, a GPS enabled mobile device could provide location information that is accurate to within a few inches while a cellular service, beacon or WiFi location capabilities of mobile device 110 could provide a location radius or location area. For example, mobile device 110 being located within range of a beacon, within the overlapping area of a number of cellular service towers, etc.

With reference still to FIG. 1, in one embodiment the user desires to capture a scene of interest 101. The 3D video camera 102 is used for capturing multiple images of a scene along with a depth map for each scene. Mobile device 110 is used for implementing a 3D rendering system and operating the complete system. Mobile device 110 is configured to enable a user to operate the image capture device, to obtain a data stream of images with depth map information for the image, which may include depth information for pre-determined spots in the image, and to perform any of a number of image manipulations based on additional software available to the tablet/smartphone computer. Mobile device 110 has programs for its internal operations and applications programs for managing the image capture and various processing tasks. Software for improved image processing applications 140 includes programs that can capture and deliver image and depth information, combine multiple images into a single 3D model for viewing, analyzing, and managing. Software for image and model manipulation and management in real time, includes image management 160, remote operations 180 and imager calibration 190. Additional software is available for performing many other functions on the captured and combined images, for a variety of purposes.

In one embodiment, 3D video camera 102 is an image capture and depth map determiner. For example, in one embodiment, 3D video camera 102 includes a red-green-blue-depth (RGB-D) camera as the principal sensor, operated by and in conjunction with Mobile device 110. The 3D video camera 102 is configured to operate with a structured-light depth map determination system. Alternatively, the 3D video camera 102 may be configured to operate with a time-of-flight depth map generator. Alternatively, the 3D video camera 102 may be configured to operate with a stereo or assisted-stereo depth map generator. Alternatively, the 3D video camera 102 may be configured to operate with a MEMS-mirror- or solid-state-LiDAR depth map generator. Sensors provide depth map data in real time using inexpensive components.

In one embodiment, a specialized infrared light beam system 103 broadcasts a dot pattern toward a scene of interest, delivering a series of tiny dots that illuminate the objects in the scene. The number and spacing of the dots defines the resolution obtainable. An imager 104, similar to what is found in digital cameras, captures the scene and the illuminating dots in a special sensor, called the PS1080. Imager 104 includes an image capture lens and a CMOS sensor. The sensor derives a synchronized depth image, a color image, and optionally an audio data stream.

3D video camera 102 may also include a custom processor 105, which may include a control portion 106 and storage 107 for color and depth information.

Similarly, fully integrated sensors 108 for performing time-of-flight (TOF) distance measurements without any moving parts are available from the PMD Technologies Co. in Siegen, Germany. More information about these systems may be found at www.pmdtec.com. The sensor generates a modulated optical signal, and measures time of flight directly.

For example, the PMD PhotonICs 19k-S3 chipset obtains distance measurements to each pixel instantly, thus providing both a 3D representation of each pixel in view in the scene, as well as grey scale illumination data, simultaneously. Data from the chipset may be read out at rates of 15 MPixels/second. PMDTech also offers a complete camera system called the CamBoard, which is the first USB powered single board 3D TOF camera. Other companies with similar products include SoftKinetic and MESA Imaging. The capture rate for these sensors permits image frame capture at rates up to 60 frames/second (fps). These sensors do not provide the same level of resolution that more complicated and more expensive scanners can provide.

In one embodiment, Mobile device 110 serves as the user interface for controlling the image sensor and depth capture sensor subsystem of 3D video camera 102. Mobile device 110 can be operated by holding it in one or two hands, without any additional support; to be able to see the resultant two-dimensional (2D) image as captured by the 3D video camera 102, on a display 116; and to be able to input control information and commands via either a touch screen (also at 116) or an optional keyboard at 117. An audio output 118 is also optional. The processor 111 available in tablet computers has suitably fast clock operations, to facilitate real time operation of the image/depth capture system and process the image and depth data, to provide a visible image in near-real to real time. Additional features and functions common in most if not all of such handheld computers available today and connected on bus 112 may include a second internal camera 113, a communications system 114 further comprising at least one of a cellular telephony link, a cellular data link, and a Wi-Fi link.

Software such as operating system 130 contains applications for operating these accessory functions, along with data management and storage in ROM 119, RAM 120, and data storage 121, which may comprise an external memory device like a USB memory stick, or any other suitable non-volatile storage medium. Besides the operating system, software may include image processing applications 140, image and image management 160, and a suite of software for imager calibration 190. In one embodiment, each of these may include a variety of separate programs. In an embodiment of the present disclosure, audio capture via the custom processor 105 and audio playback via software in the operating system 130 enable capture and playback of sounds during image capture as well. This feature facilitates verbal note-taking while performing the image data capture if so desired. In one embodiment, a local positioning system 115 or aiming system may also be used.

In one embodiment, image processing applications 140 are provided for using a stream of RGB-D video frames to form the combined 3D data set. These include Image Capture and Pre-processing programs as one of the group of image processing applications 140, the Computer Vision and Scanning suite. For capturing and rendering, the suite includes a real-time RGB-D image visualization program. The software will operate on mobile device 110.

In an embodiment, new stitching or combining software is used to automatically merge two or more images together to form a composite 3D model using aspects such as the use of keyframes as discussed in more detail herein. With this software tool, a model may be created from one or more images taken from different viewpoints in the scene. This process is done in real-time, on-the-fly, so that the user can, at any time, view the formed 3D model, even during capturing, from a variety of viewpoints. This includes the current viewpoint of the attached camera, resulting in an augmented-reality-style visualization. The instant 3D model formation enables a user to see where additional contextual information may be useful, and enables the user to point the camera to the desired region to obtain the contextual information.

Elements of the software include suggestions for user-initiated actions to complete a portion of a scanned image, including directions to aim the 3D video camera 102. Because of the power of the combining algorithms used, including the capability of 3D reconstruction, images obtained from other instruments with differing levels of detail may also be inputted into the mobile device 110. The advantage of fast combining or modeling means that field adjustments and retakes can be done in near real-time with these other instruments as well as with the instant system. For example, image capture devices which also produce 3D depth maps along with greyscale or color images may be inputted to this system.

In one embodiment, the software provides an integrity metric to indicate when there is not enough data to perform a decent combining or 3-D modeling operation or to obtain registration of particular image with a previously declared registration point in the image. The declared registration point may be obtained from an arbitrary model, either from a computer-aided design (CAD) model or a 3D point cloud model. The user interface is changed in a way that the user sees or is notified where there is not enough data captured in the scene as the scene is being combined or modeled.

Figure 2:
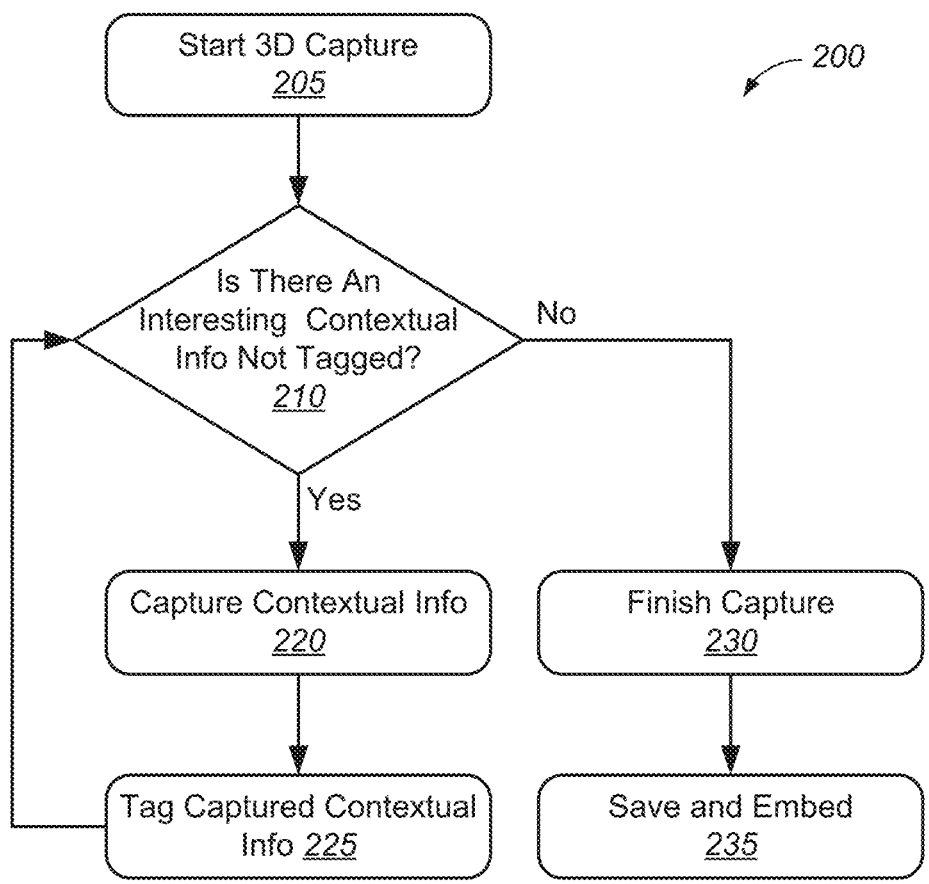
FIG. 2 is a flowchart for capturing additional contextual information while capturing 3D information, in accordance with an embodiment.

With reference now to FIG. 2, a flowchart 200 for capturing additional contextual information while capturing 3D information is shown in accordance with an embodiment.

Figure 4A:
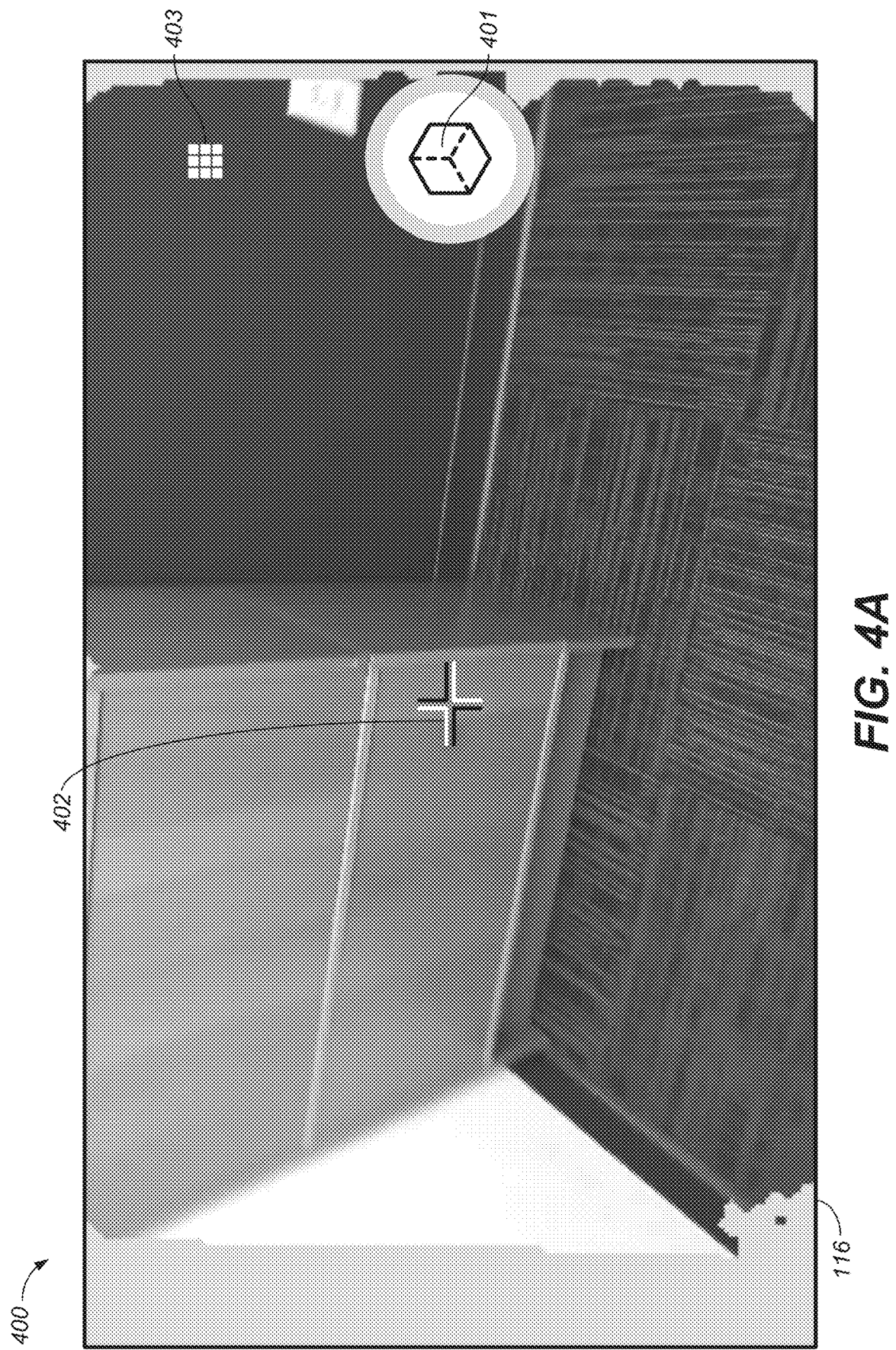
FIG. 4A is a screen shot of an initial image view of the scene capturing process presented on a display screen in accordance with an embodiment.

At 205 of FIG. 2, the user will start the 3D capture. An example of the start of the capture is shown in FIG. 4A which provides a screen shot 400 of an initial image view presented on a display 116 in accordance with an embodiment. As shown in screen shot 400, the view presented on display 116 includes crosshairs 402, main menu 403, and scan start/stop 401.

Crosshairs 402 is a displayed graphic that that gives the user the ability to tag whatever is under the crosshair at the time of capture at the push of a button, or other user command (e.g. spoken command) or determined automatically by the software based on a variety of other factors (e.g. motion of the capture device, time, etc.).

In one embodiment, to perform the tagging, the 3D capture device pose tracking technology (e.g. as provided by the DotProduct DPI-8 or the Lenovo Phab 2 Pro products) provides the application developer with continuous camera pose estimates (spatial position and orientation), typically at a rate of equal to or higher than one pose per camera frame.

The camera pose at the time a tagging event occurs can be determined using 3D pose tracking technology. Information from a software interface or as loaded from a calibration file is used to obtain the capture camera intrinsic information (focal lengths, optical center, lens distortion parameters).

The camera pose at the time of the tagging event, the camera intrinsic parameters and the position of the crosshair uniquely determine a position and direction vector in space at the time of capture by: $p=t$, $d=R*uncam(c)$ where p is the position vector, t is the translation part of the camera pose matrix Rt, d is the direction vector, c is the crosshair position in camera pixel coordinates, R is the rotation part of the camera pose matrix and uncam( ) is a function that takes camera pixel coordinates to normalized camera coordinates. If necessary, the obtained position and direction vectors can then be intersected with the geometry of the captured scene to obtain the tag position in the global frame.

For example, a set of 3D points in the current captured scene using the crosshair 402 position and either the currently captured depth map (in case a depth sensor is the capturing unit) or the currently captured point cloud (in case a LiDAR based sensor is the capturing unit), the point set obtained by querying the depth map/point cloud for points in the neighborhood of the crosshair position, or the 3D model currently under capture, the point set obtained by querying the 3D model for points in the neighborhood of the tag position. Then fit a geometric primitive or parametric shape to the point set using shape fitting techniques. Then, by knowing the camera pose as well as the primitive or shape pose in the camera frame the primitive or shape pose in the global frame can be computed by multiplying the local primitive or shape coordinates with the pose matrix.

In one embodiment, the 3D video camera 102 will start the capture when scan start/stop 401 is selected. Once scan start/stop 401 is selected the 3D video camera 102 works by grabbing frames of points and within each frame the depth associated with each point. In one embodiment, the initial starting point of 3D video camera 102 could be assigned the vector (0,0,0). In another embodiment, the initial starting point of 3D video camera 102 could be assigned coordinates determined by a GPS.

In one embodiment, 3D video camera 102 keeps track of its location based on the spatial relationship of the current camera frame with already captured imagery. For example, as 3D video camera 102 moves from the initial starting point (e.g., moved rotationally, moved around the room, a combination of rotation and movement, pitch, yaw, roll, a combination of any/or all of the motions, etc.), it keeps track of its position by comparing elements in the current camera image to previous camera images. In one embodiment, the comparison is performed by a keyframe-based method that uses a stitching operation that aligns two or more RGB-D images as described herein. In another embodiment the comparison is performed by an off-the-shelf camera pose tracking system, such as found in mobile devices using Apple™ Inc's ARKit™ or Google™ Inc's ARCore™ or Tango™ technologies. In general, the pose tracking allows the 3D model to be developed and the location/look direction, etc. of the 3D video camera 102 to be determined without requiring 3D video camera 102 or mobile device 110 to maintain or obtain any additional location information.

In one embodiment, if the 3D video camera 102 is turned off during the capturing process, is moved to a different position too quickly or moved to scenes unsuitable for pose tracking (such as scenes lacking a minimum of structure and texture) or if it's otherwise not possible for the tracking to relate the current frame content to the previously captured frames, the system will report the loss of tracking. In one embodiment, to realign/reorient the "lost" 3D video camera 102, it can be aimed at a previously captured section and then continue to be moved about the area to be captured and modeled. In so doing, the newly captured imagery will be compared with the previously captured imagery and the 3D video camera 102 will be re-localized.

In one embodiment, if the scene being captured is bland (e.g., lacking a minimum of structure and texture), it may be necessary to return the 3D video camera 102 to an obvious geometry, color, or other identifier within the scene that will provide enough information to allow the re-localization to occur. In one embodiment, during the capture process of the 3D scene, the redundant information captured when performing the re-localization would be ignored.

At 210 of FIG. 2, one embodiment determines if there is any interesting contextual information that has not been tagged. For example, during the capturing of the imagery by the 3D video camera 102, there may be a section, portion, location, item, or the like that a user would like to capture in addition to the 3D imagery being captured.

Figure 4B:
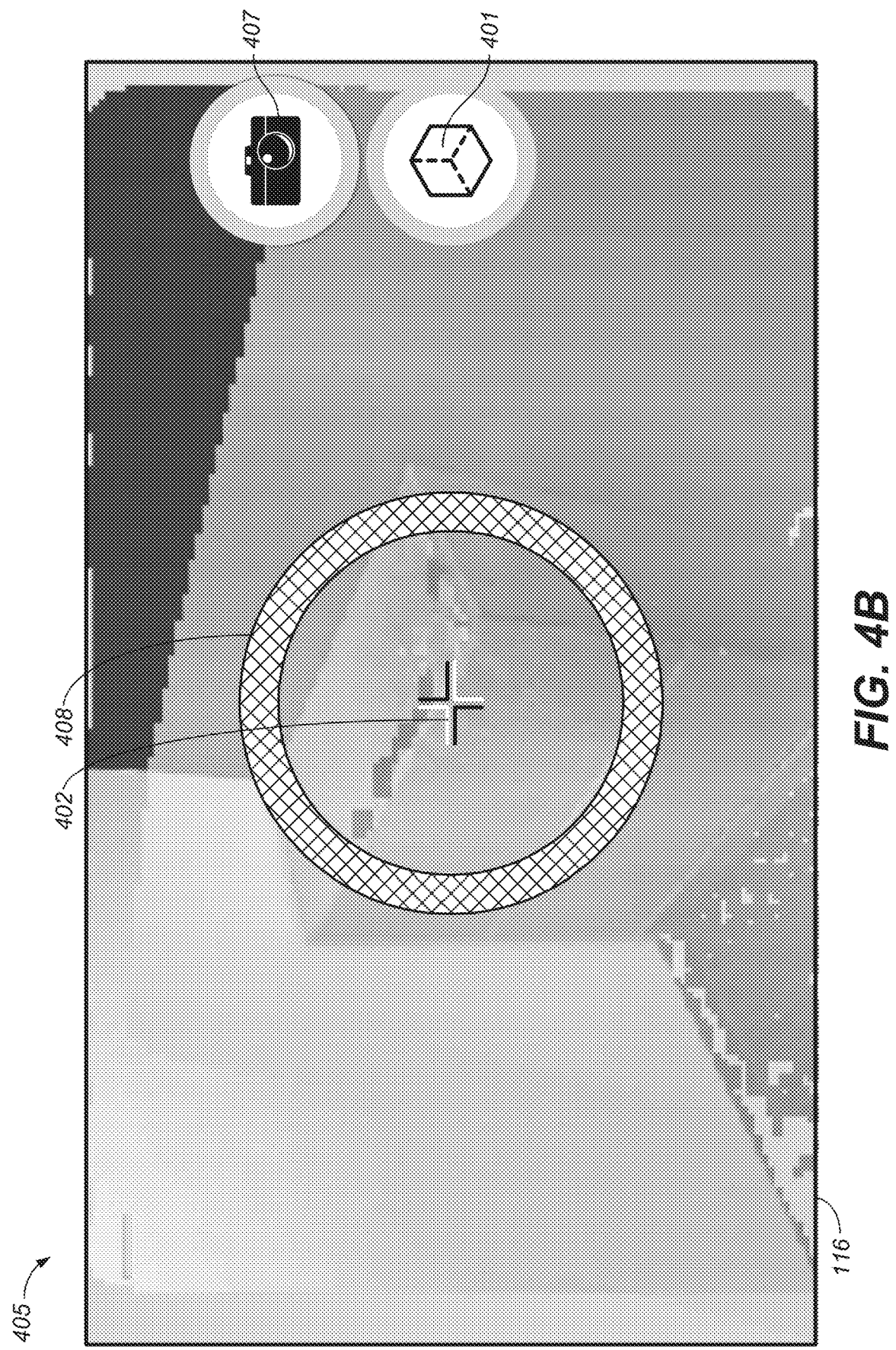
FIG. 4B is a screen shot of 3D capture view presented on the display screen in accordance with an embodiment.

At 220 of FIG. 2, when it is determined that there is interesting contextual information that has not been tagged, the contextual information is captured. For example, referring to FIG. 4B, a screen shot 405 of a 3D capture view presented on the display 116 is shown in accordance with an embodiment. Screen shot 405 includes crosshairs 402, contextual information capture 407, scan start/stop 401, and large ring 408. In general, large ring 408 is used to indicate to the user that there is too much motion for the contextual information capturing device (e.g., a 2D camera, a 2D video camera, a sound recorder, or the like which may be part of/or a module added to mobile device 110) to obtain a 2D image (or 2D video, sound recording, etc.). In one embodiment the contextual capturing device may be of higher resolution than what is already embedded in the 3D capture device.

Figure 4C:
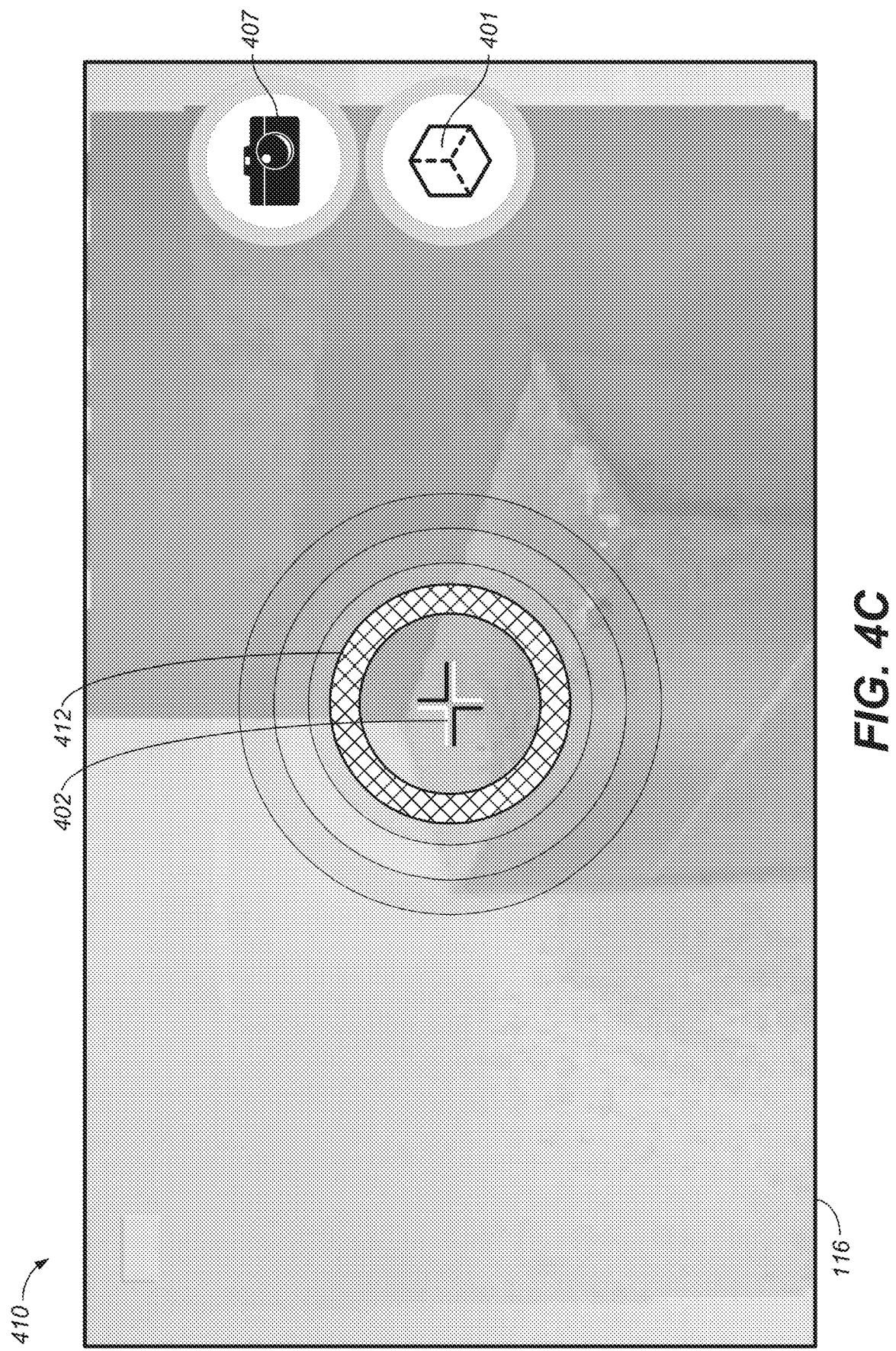
FIG. 4C is a screen shot of a contextual information capture ready view presented on the display screen in accordance with an embodiment.

Referring now to FIG. 4C, a screen shot 410 of a contextual information capture ready view is presented on the display 116 in accordance with an embodiment. Screen shot 410 includes crosshairs 402, contextual information capture 407, scan start/stop 401, and small ring 412. In general, small ring 412 is used to indicate to the user that the motion has been reduced to within the bounds of contextual information capturing device's ability to capture a higher resolution image (or video). Once large ring 408 disappears and small ring 412 appears the user can select contextual information capture 407 and capture the contextual information.

Figure 4D:
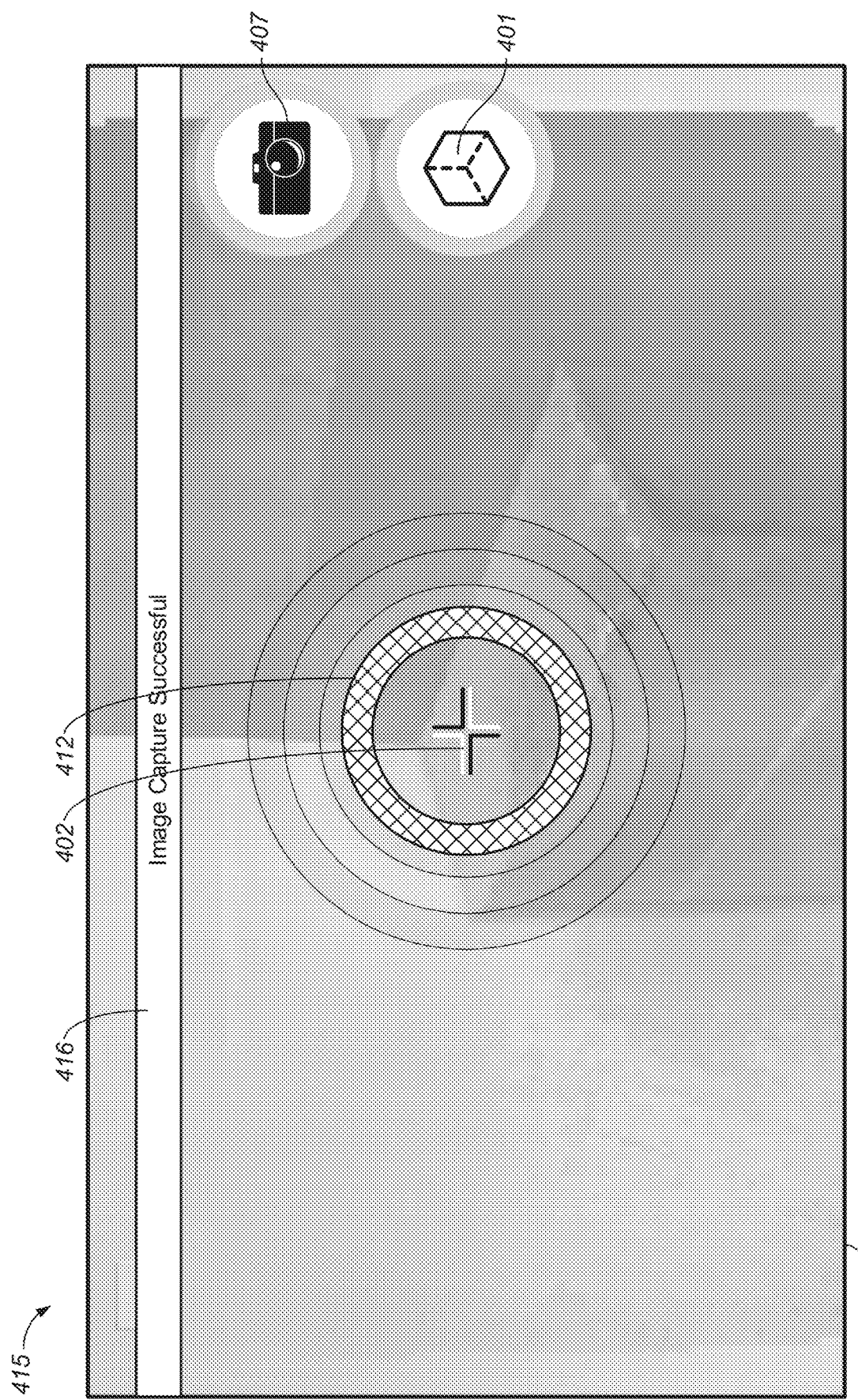
FIG. 4D is a screen shot of a successful contextual information capture view presented on the display screen in accordance with an embodiment.

With reference now to FIG. 4D, a screen shot 415 of a successful contextual information capture is presented on the display 116 in accordance with an embodiment. Screen shot 415 includes crosshairs 402, contextual information capture 407, scan start/stop 401, small ring 412, and information ribbon 416. In general, information ribbon 416 indicates the contextual information has been successfully captured.

In other words, the 3D video camera 102 is held relatively still, contextual information capture 407 is selected and the contextual information is captured. Although a 2D higher resolution image is discussed in a number of examples herein as the contextual information, it should be appreciated that the contextual information that is captured could be any or all of a 2D image, a sound recording, a video recording (e.g., a video snippet), and the like, whereby the resolution of an image camera or video camera may be equal to or higher than the resolution of the image- or video-camera already embedded in the image/depth capture module 102. However, depending upon the size or necessary clarity of the contextual information to be captured, the equal or higher resolution could be selected from resolutions such as, but not limited to, HD, 1080p, 2K, 4K, 8K, 64K, 2 Mpix, 5 Mpix, 10 Mpix, 51 Mpix, etc.

In one embodiment, instead of (or in addition to) a user having to actively perform the collection of the contextual information (e.g., tap contextual information capture 407) a number of different collection methods could be used. For example, during the 3D video camera 102 capturing process, if the 3D video camera 102 is aimed at the same area for a predefined amount of time (e.g., 5 seconds) an automatic capture of contextual information could occur.

In one embodiment, if the 3D video camera 102 determines that a window, open door, or the like, is in the scene, an automatic capture of contextual information could be performed. The automatic capture could be a higher resolution photo, a higher resolution video, a sound recording or any combination thereof.

In one embodiment, if the 3D video camera 102 determines that a sound is audible in the scene, an automatic capture of contextual information could be performed. In one embodiment, the sound could be one of a predefined number of sounds such as a siren, train whistle, engine noise, voice command, etc. In one embodiment, the automatic capture of contextual information (e.g., a sound recording) could be performed when any sound is discerned. Although a number of different automatic capture methods are discussed, it should be appreciated that there are other ways that could be predefined as reasons for automatic capture of contextual information. Moreover, any or all of the automatic contextual information capture features could be manually, remotely or otherwise turned on or off.

At 225 of FIG. 2, the captured contextual information is tagged. In general, once the user tags something in the scene during capture a number of actions are possible. The tagging action can include, but are not limited to, a picture taken using a camera directly available to the mobile device 110 (such as a built-in or attached RGB camera) and its pose at the time of capture spatially embedded in the 3D scene; a 3D point in the scene is identified and tagged as important (e.g., a point of importance), a 3D point in the scene is identified and tagged using a voice-note that the user can record on the mobile device 110; a plane, cylinder, cone or other geometric primitive or parametric surface is fitted and linked to the 3D data under the crosshair; a geometric link for a plurality of points to establish a drift correction for the 3D imagery; a measurement of a distance from a first point in the user interactive version of the 3D scene to a second point in the user interactive version of the 3D scene; a measurement from one scene feature to another is taken and linked to the measurement end-points; and the like.

In one embodiment, the contextual information capturing device is in a known orientation and position with respect to the 3D video camera 102 (e.g., a known spatial relationship). For example, the contextual information capturing device could be fixedly mounted to the 3D video camera 102, coupled in a housing that also contains the 3D video camera 102, offset a predetermined distance and relative orientation from the 3D video camera 102, or the like. In one embodiment, the contextual information capturing device is separate from the 3D video camera 102 and when the contextual information is obtained, the 3D video camera 102 would note its pose information while the contextual information capturing device would determine its own pose information, orientation information. In so doing, the data associate with the added contextual information would include the pose information, such that when the contextual information is visualized in the 3D scene it would be properly located and oriented. This orientation and position information would be a capturing device pose.

Once the contextual information is tagged, the flow returns to 210 where the determination as to whether there is any interesting contextual information that has not been tagged is repeated. If additional contextual information is recognized as not yet being tagged, the loop of 220 and 225 repeat. Once all contextual information is tagged, the loop ends and the flow continues to 230.

At 230 of FIG. 2, the capture of information is finished. In general, the reason for utilizing a secondary source to provide contextual information is that utilizing lower resolution on the 3D imagery reduces the amount of data that needs to be processed in order to build the 3D model. That is, the amount of data captured by the 3D video camera 102 can be significantly reduced while the gist of the 3D scene is captured. In so doing, the 3D imagery can be captured and the 3D model can be built using the computational capabilities of the mobile device in near-real time, there is no need for outside processing, for sending reams of data to a more powerful machine for processing, for waiting for the development of the 3D model, etc.

At 235 of FIG. 2, the information is saved and embedded into the 3D model. A global 3D point in the scene corresponding to the touch/click point can be obtained by q=P*r(c)*d where q is the 3D scene point, P is the camera pose matrix, d is the direction vector, and r is the depth map that yields a scalar depth given an input pixel coordinate. For example, the pixel position of a global 3D point in an embedded 2D picture can be determined by i=cam(proj(P-1*q)) where q is the global 3D scene point, P is the camera pose matrix of a 2D embedded picture, i is the position of the global 3D scene point in pixel coordinates in the embedded 2D picture, cam( ) is a function that takes normalized camera coordinates to pixel coordinates and proj( ) is a function that divides a vector by its last component.

Using the point depth a=(P-1*q)z and the pixel coordinate i the occlusion is determined by comparing a to r(i). If a<r(i) then the point is visible from the embedded 2D picture, otherwise the point is occluded by the embedded picture content.

Figure 3:
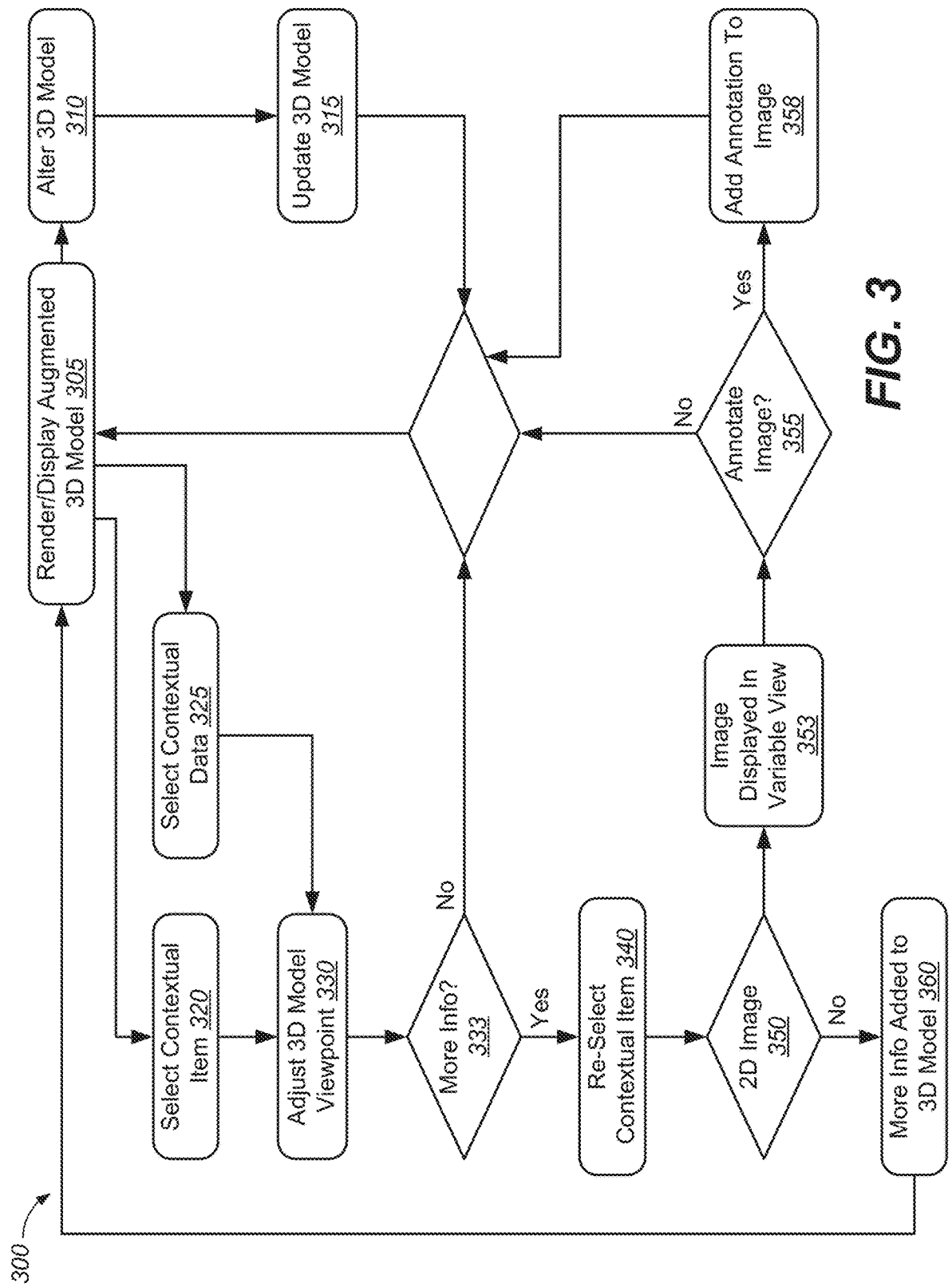
FIG. 3 is a flowchart for the display and modification of captured 3D scenes augmented with contextual information, in accordance with an embodiment.

With reference now to FIG. 3, a flowchart 300 for displaying captured 3D scenes augmented with contextual information is shown in accordance with an embodiment. For example, as the 3D scene is rendered, any contextual information that has been added to the scene can be shown as icons, links, etc. embedded in the 3D scene such as shown in FIGS. 4E through 4K.

In one embodiment, the 3D scene is rendered as usual (e.g. as a point cloud or mesh or using image-based rendering techniques) with a 3D graphics library (such as OpenGL or Direct3D) making sure a valid Z buffer is retained after the last scene drawing call finishes (but before the rendering is presented to screen—e.g. by a swap-buffers command). Then the contextual scene information (or abstractions thereof, e.g. symbols) is rendered into the same buffer with the same 3D graphics library, using the Z buffer for determining occlusion.

In another embodiment, the contextual scene information may be rendered first or in between the commands that drive the scene rendering as long as a valid Z buffer is maintained at all times. In yet another embodiment, the scene may be rendered in a first drawing pass without the contextual information and in a second drawing pass the contextual information may be rendered "on top", provided that the first drawing pass left a valid Z buffer for determining occlusion information or that the graphics library has the capability to run occlusion queries.

In so doing, the composition of the first and second drawing pass into a final rendering may happen within the graphics library within a UI framework that also uses the graphics library (such as Qt Quick). In this case the first drawing pass would draw into an off-screen surface that would then be used in the final composition. Or it may happen outside the graphics library by a compositor provided by the operating system.

Figure 4E:
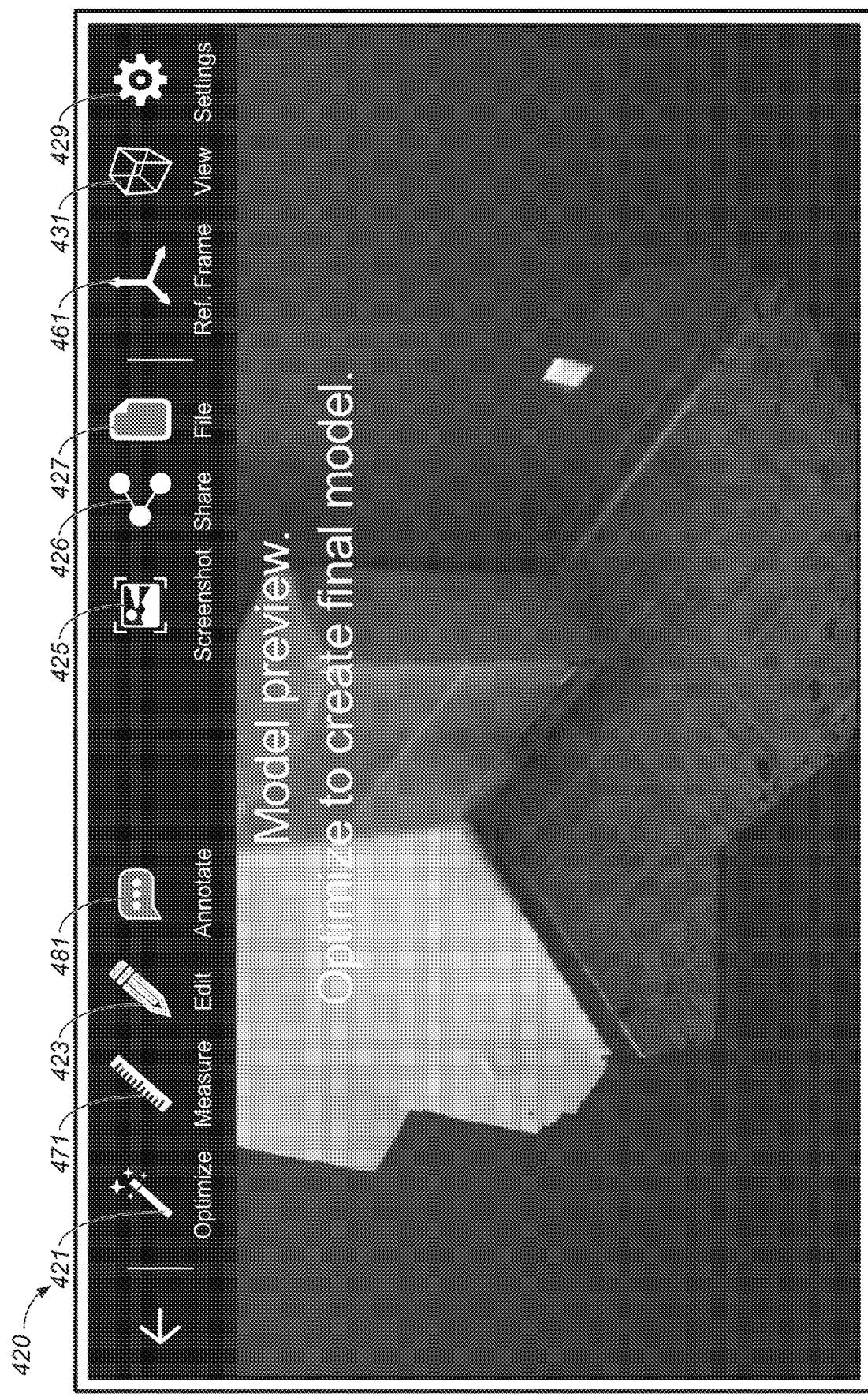
FIG. 4E is a screen shot of a 3D scene preview prior to optimization presented on the display screen in accordance with an embodiment.

With reference to FIG. 4E, a screen shot 420 of a 3D scene preview prior to optimization is presented on the display 116 in accordance with an embodiment. In general, screen shot 420 includes a model preview that is not optimized and a number of optional action icons in a ribbon. The actions include optimize 421, measure 471, edit 423, annotate 481, screen shot 425, share 426, file 427, reference frame 461, view 431 and settings 429.

In general, edit 423 allows lower quality points to be edited out, the cropping out of areas that are not of interest, and the like; screen shot 425 captures data, annotations, measurements, etc.; share 426 allows the data to be shared as screen shots, dp files, etc. and via email, drop box or the like; file 427 is where the data is saved, and settings 429 are different user adjustable settings. The actions: optimize 421, measure 471, annotate 481, reference frame 461, and view 431 are described and shown in additional detail in the remaining FIGS. 4F-4K and the discussion of FIG. 3. Further, although a specified number and type of actions are shown, it should be appreciated that there could be more, fewer, or different actions displayed across one or more of FIGS. 4E-4K.

At 305 of FIG. 3, the augmented and rendered 3D model is displayed. That is, the optimize 421 action has been selected and the 3D model has been optimized. In general, optimizing the scene will address drift correction and utilize features such as keyframes to improve the accuracy, color, and general quality of the 3D data.

At 310 of FIG. 3, the user alters the 3D scene structure such as by using a global scene optimization feature such as optimize 421. At 315, the positions and poses of the contextual information are updated according to the change in the 3D scene structure.

Optimization

In general, during 3D video capture, as the 3D video camera 102 moves about a room, down a hall, up some stairs, and the like, there is an amount of error or drift that can be introduced. However, using keyframes, geometric features, and the like, the amount of error that occurs in the 3D model can be reduced or even removed (e.g., optimized).

For example, by using keyframes as described in U.S. Pat. No. 9,332,243B2 issued on May 3, 2016, which is hereby incorporated by reference in its entirety, there are captured 3D images that are considered keyframes. For example, the first image captured would be keyframe Alpha. If the capture rate is 30 frames per second (fps), depending upon the speed of camera movement, there may be a number of frames that contain information very similar to that of keyframe Alpha. However, at some point in the movement of the 3D video camera 102 there will be a percentage of information that is new, e.g., not in keyframe Alpha. In general, the percentage is user adjustable or fixed, but for purposes of the discussion an exemplary 37% will be utilized.

When the new information in the frame reaches or exceeds 37% that frame will be identified as a keyframe, e.g., keyframe Bravo. This process can continue throughout the 3D video camera 102 operation such that any numbers of keyframes are obtained. For example, a 3D scan could include 5,000 total frames and 500 keyframes. To reduce the file size (e.g., memory requirements), processing requirements, and the like, only the 500 keyframes are kept and the remaining 4,500 frames are discarded. In one embodiment, the 4,500 non-keyframes could be discarded after the scene has been completely scanned.

In another embodiment, the non-keyframes are discarded as soon as a next keyframe is reached. For example, if there are 100 frames between keyframe Alpha and the identification of keyframe Bravo, as soon as keyframe Bravo is identified, the 100 in-between frames are discarded. In so doing, the memory requirements are significantly reduced. Moreover, the amount of measurement error is also reduced as the measurement error is now between keyframes instead of each and every captured 3D image. In so doing, the rendering of the 3D scene/environment/model will be performed using only the keyframes. In another embodiment, the non-keyframes are discarded as soon as their non-keyframe-ness is determined by the program and their data has been used by the program e.g. to alter, refine or extend other existing keyframes.

Similarly, geometric features can be used to correct errors in the 3D imagery. For example, if the 3D video camera 102 is going up stairs, the landing of floor 1 could be tagged as being parallel to the landing of floor 2, the landing of floor 3, etc. In so doing, the 3D model would be pulled into alignment based on the indications that the landings at each floor are parallel and hence drift would be minimized. As such, instead of having a 14 story drift that causes a significant lean to the 3D model, there would only be minimal floor-to-floor drift which would be automatically corrected at each landing. This tagging could similarly be used on parallel walls, wall-to-floor intersections, etc.

In one embodiment, to transform the contextual information (e.g., 2D imagery) into the 3D scene, a link is used to tie the 2D imagery to the best keyframe. E.g., the keyframe from which the point is visible based on closeness of the point to the optical center of the keyframe and the surface angle under which the point appears in the keyframe and the presence of nearby points in the keyframe point cloud is obtained. The 3D point is then expressed in keyframe camera coordinates and converted back to global coordinates after the structural change has happened (which may of course have altered the keyframe pose). Changes in the keyframe point cloud are also taken into account and the depth of the tagged point is adjusted accordingly in camera coordinates before converting back to global coordinates.

With reference again to 305 and now to FIG. 4F, a screen shot 430 of an optimized 3D scene including a view 431 tool bar is presented on display 116 in accordance with an embodiment. In general, screen shot 430 illustrates the optimized 3D model and a number of optional action icons provided in a tool bar after the selection of view 431. The actions include surface 432, points 433, camera frusta 434, frames 435, home 436, and up arrow 437. In general, home 436 and up arrow 437 are optional/adjustable/re-definable actions. For example, in one embodiment, up arrow 437 would return to the previous screen while home 436 would return to the main menu, a fresh capture set-up, or the like.

In one embodiment, surface 432 provides the display of the 3D model as surfaces such as the wall and cabinet. In contrast, points 433 will display the 3D model as a collection of individual 3D points with each point sized dependent on the display screen resolution and a user selected value. Camera frusta 434 will show the location of the contextual information (including the pose) in the 3D model as shown and described in further detail in the discussion of FIG. 4G. Frames 435 provides a side bar to the 3D model that includes a preview of the contextual information which is shown and described in further detail in the discussion of FIG. 4H.

At 320 of FIG. 3, the user touches/clicks/or otherwise selects a contextual information identifier in the rendered 3D scene. For example, referring to FIG. 4G, a screen shot 440 of an optimized 3D scene rendered with contextual information identifiers 441-443 presented on the display 116 is shown in accordance with an embodiment. For purposes of clarity, only the aspects of screen shot 440 of FIG. 4G that are different than those of FIG. 4E are described. In screen shot 440, the contextual information identifiers 441-443 are displayed within the 3D model environment.

Contextual information identifiers 441-443 images could include a location, an orientation of the captured contextual information, etc. In one embodiment, if a viewer of the 3D scene wants to see what is included in the contextual information, they would select one of the contextual information identifiers 441-443 and then the contextual information that was captured would be displayed.

For example, the 3D scene could be an electrical room and the contextual information is a high resolution photo of a fuse box that would provide detail and resolution about the contents of the fuse box, labels on the fuse box, information written in the fuse box, etc. In another embodiment, the 3D scene could be a crime scene and the contextual information could be a sound recording from an answering machine that is linked to the answering machine in the 3D scene. In yet another embodiment, the 3D scene could be an engine room and the contextual information could include a sound recording and a high resolution video snippet that would provide operating sounds to allow a mechanic to evaluate the operation of an engine therein.

Figure 4F:
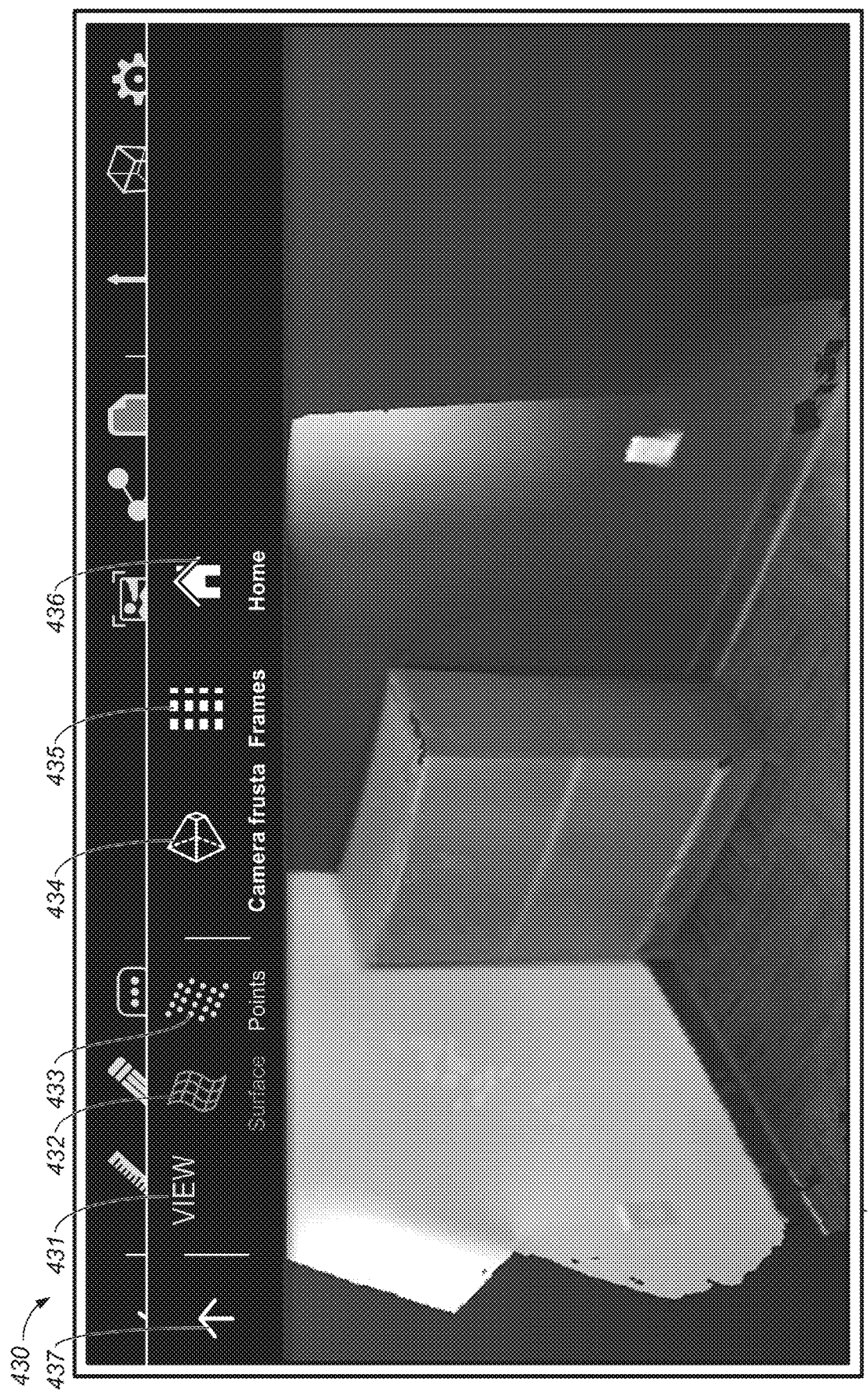
FIG. 4F is a screen shot of an optimized 3D scene including a view tool bar presented on the display screen in accordance with an embodiment.
Figure 4G:
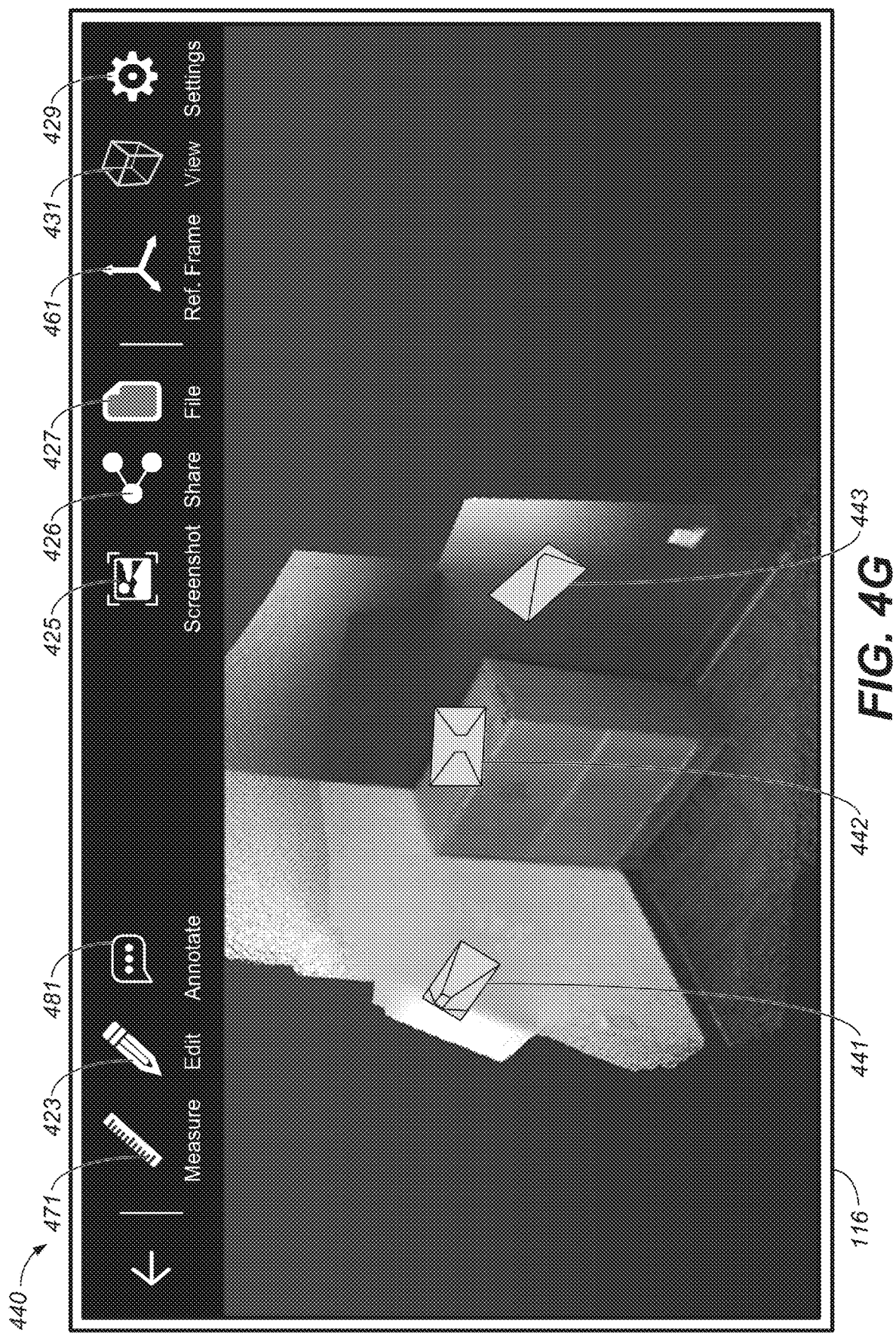
FIG. 4G is a screen shot of an optimized 3D scene rendered with contextual information identifiers presented on the display screen in accordance with an embodiment.
Figure 4H:
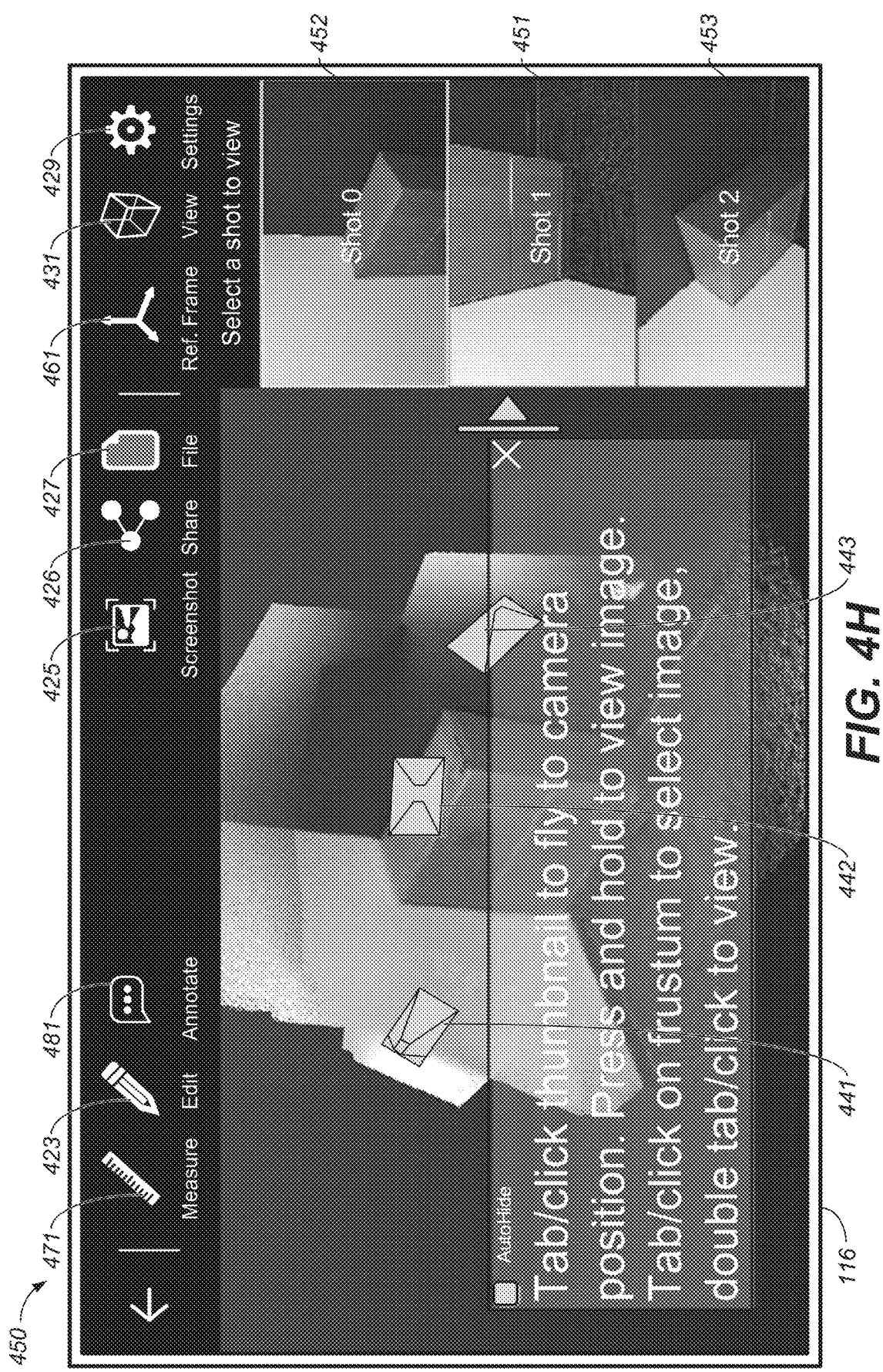
FIG. 4H is a screen shot of an optimized 3D scene rendered with contextual information identifiers and their associated image frames presented on the display screen in accordance with an embodiment.

The 3D scene could include any number of contextual information identifiers 441-443. The user could select one to access the underlying contextual information, close the contextual information to return to the 3D scene and then select another of the contextual information identifiers 441-443. Although three contextual information identifiers 441-443 are shown in FIGS. 4G and 4H, the use of three contextual information identifiers is provided merely for purposes of clarity.

At 330 of FIG. 3, the virtual scene camera "flies" to the viewpoint from which the contextual information was captured. In one embodiment, as shown in screen shot 440 of FIG. 4G, the contextual information is displayed within the 3D model. For example, when the user selects one of contextual information identifiers 441-443, the virtual camera used for the rendering of the 3D scene would "fly" from its current position into the pose of the contextual information within the 3D model such the end of the camera flight that the virtual 3D capture device has assumed the pose associated with the selected contextual information.

In one embodiment, a special 2D/3D visualization technique is provided for the case when the user selects an embedded 2D picture and the virtual scene camera "flies" from its current viewpoint to the viewpoint that the picture was taken from. In that case, the rendering of the 3D model gradually blends into a rendering of the 2D picture when the virtual scene camera pose is in the vicinity of the embedded picture pose, taking into account parallax effects due to varying depth, such that when the virtual camera reaches its destination position the augmented rendering of the 3D model becomes equal to the 2D picture.

Thus, the selection of the fuse box contextual information identifier would present the higher resolution image of the fuse box within the 3D scene to maintain the context, spatial information, and the like for the user viewing the 3D scene.

By embedding the contextual information (e.g., a 2D higher resolution image) into the 3D model, it also allows 3D information, (e.g., depth, angle, etc.) to be obtained from the 2D higher resolution image. For example, since the 3D imagery is underlying the 2D image, the dimensional data from the underlying 3D imagery can be mapped to the pixels in the overlaid 2D image.

For example, by using 3D model rendering and based on the embedding of the 2D image into the 3D model, any dimensional data from the 3D model that falls within a scope of the 2D image is tied to the 2D image thereby generating a depth-mapped 2D image. The depth-mapped 2D image allows the dimensional data to be available when the depth-mapped 2D image is presented outside of the 3D model (e.g., depth measurements can be obtained from the 2D image). Such as, if the 2D image is selected from the list and displayed alone, shared, emailed, or the like.

At 325 of FIG. 3, the user selects the contextual information from a list such as frames 451-453. For example, with reference now to FIG. 4H, a screen shot 450 of an optimized 3D scene rendered with contextual information identifiers 441-443 and their associated frames 451-453 are presented on the display 116 in accordance with an embodiment. For purposes of clarity, only the aspects of screen shot 450 of FIG. 4H that are different than those of FIG. 4G are described. In general, screen shot 450 is obtained when frames 435 of FIG. 4F is selected. In one embodiment, when frames 435 is selected, any contextual information that would be found in the 3D scene are provided in a side bar to the 3D model that includes a preview of the contextual information. For example, frame 452 is the image that is indicated by contextual information identifier 442, frame 451 is the image that is indicated by contextual information identifier 441, and frame 453 is the image that is indicated by contextual information identifier 443. Although one version of the frames 451-453 layout is shown it should be appreciated that the visual layout of frames 451-453 may take several forms (e.g. vertical/horizontal lists, a 2D grid of items, etc.).

In one embodiment, one piece of contextual information could be displayed as stand-alone information. For example, when the user selects a contextual information identifier or frame (e.g., double-clicks/double-taps a contextual information identifier or frame, etc.) the contextual information would be presented to the user as stand-alone data outside of the 3D model. Thus, such selection of the fuse box contextual information would open the higher resolution image on the full display of the mobile device and outside of the 3D model. However, even though the 2D image would be displayed outside of the 3D model, since the 2D image has been mapped to the 3D model, the measurement information would still be available.

Figure 4I:
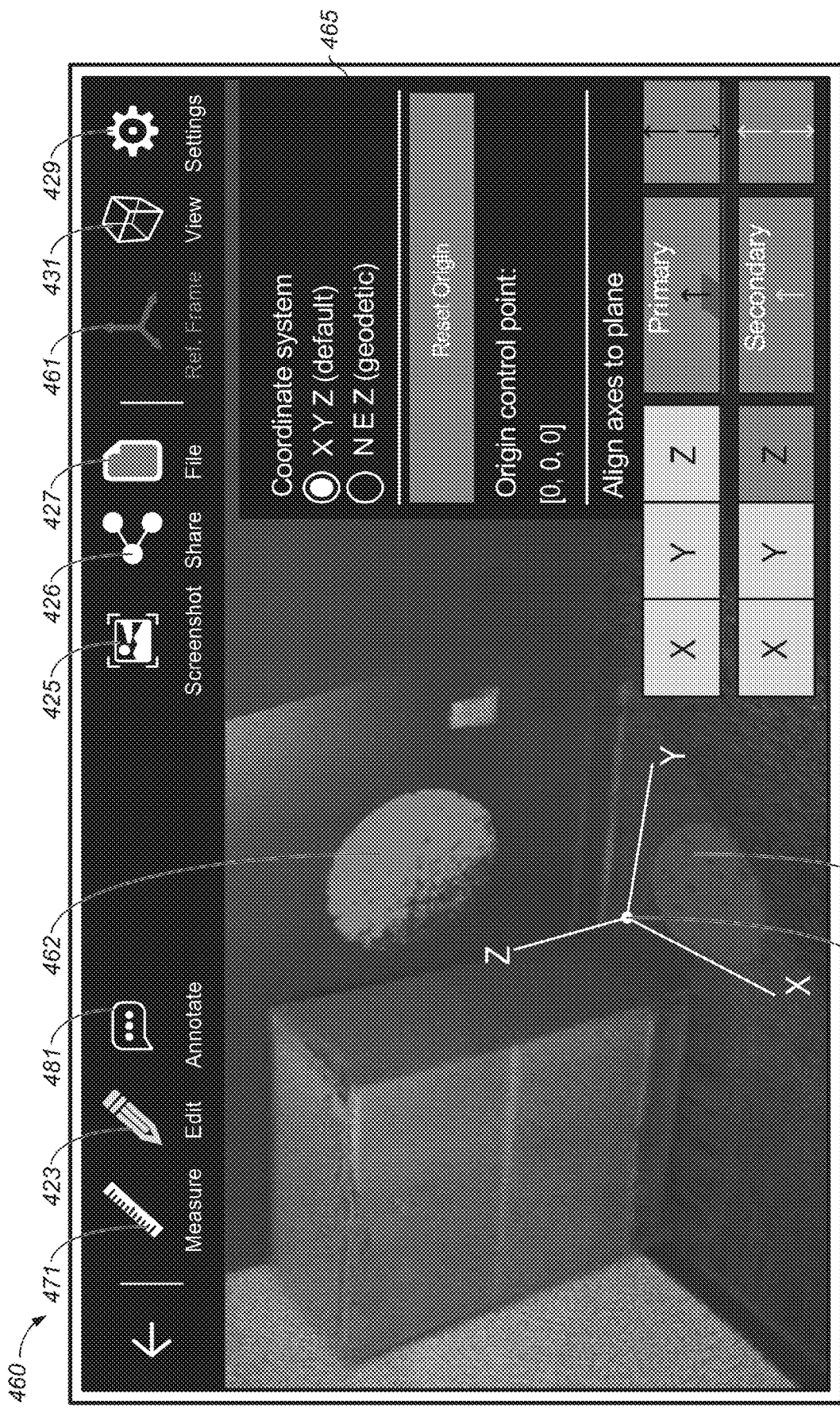
FIG. 4I is a screen shot of an optimized 3D scene with an added reference coordinate system presented on the display screen in accordance with an embodiment.

Referring now to FIG. 4I, a screen shot 460 of an optimized 3D scene with an added reference coordinate system 465 presented on the display 116 is shown in accordance with an embodiment. In one embodiment, screen shot 460 is reached by selecting the reference frame 461 icon from the top ribbon. Although a number of screen menus and operation/activity names are provided herein, the naming and menus are exemplary. That is, the location of the operation/activity within the menu system and the name of the operation/activity could be amended during software revisions, based on user feedback, or for many other legal, utilitarian or other reasoning. For example, "reference frame" could also be called "coordinate system" and found under the "Edit" menu items, etc.

After reference frame 461 icon is selected, the use is able to reference the origin point or any known point in the scene, e.g., point 464. In one embodiment, the user sets the origin (of the reference system) by selecting a "set origin" option and then holding a point within the 3D scene, e.g., holding a floor point 463. After floor point 463 is selected, the user can select the primary z-axis while holding floor point 463 which will set the z-axis to be directed straight up from the floor. The user can then tap to set the x-axis as secondary axis and then tap-and-hold a point on the wall 462 to set the x-axis straight out from the wall. This will establish a suitably oriented xyz reference system at point 464. Once the reference system 465 is established, all 3D data can automatically be referenced to that selected coordinate system.

Figure 4J:
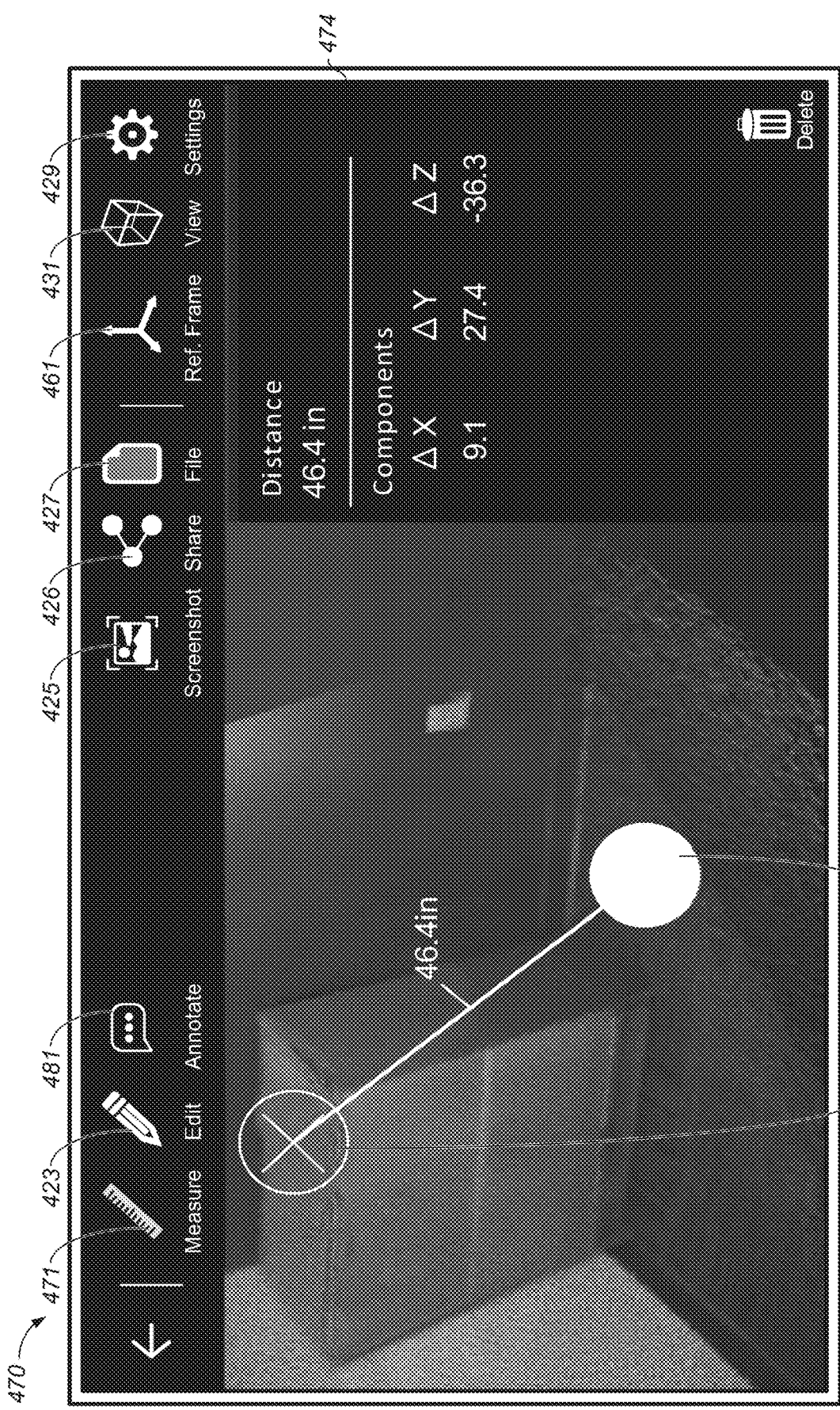
FIG. 4J is a screen shot of an optimized 3D scene showing an in-scene measurement capability presented on the display screen in accordance with an embodiment.
Figure 4K:
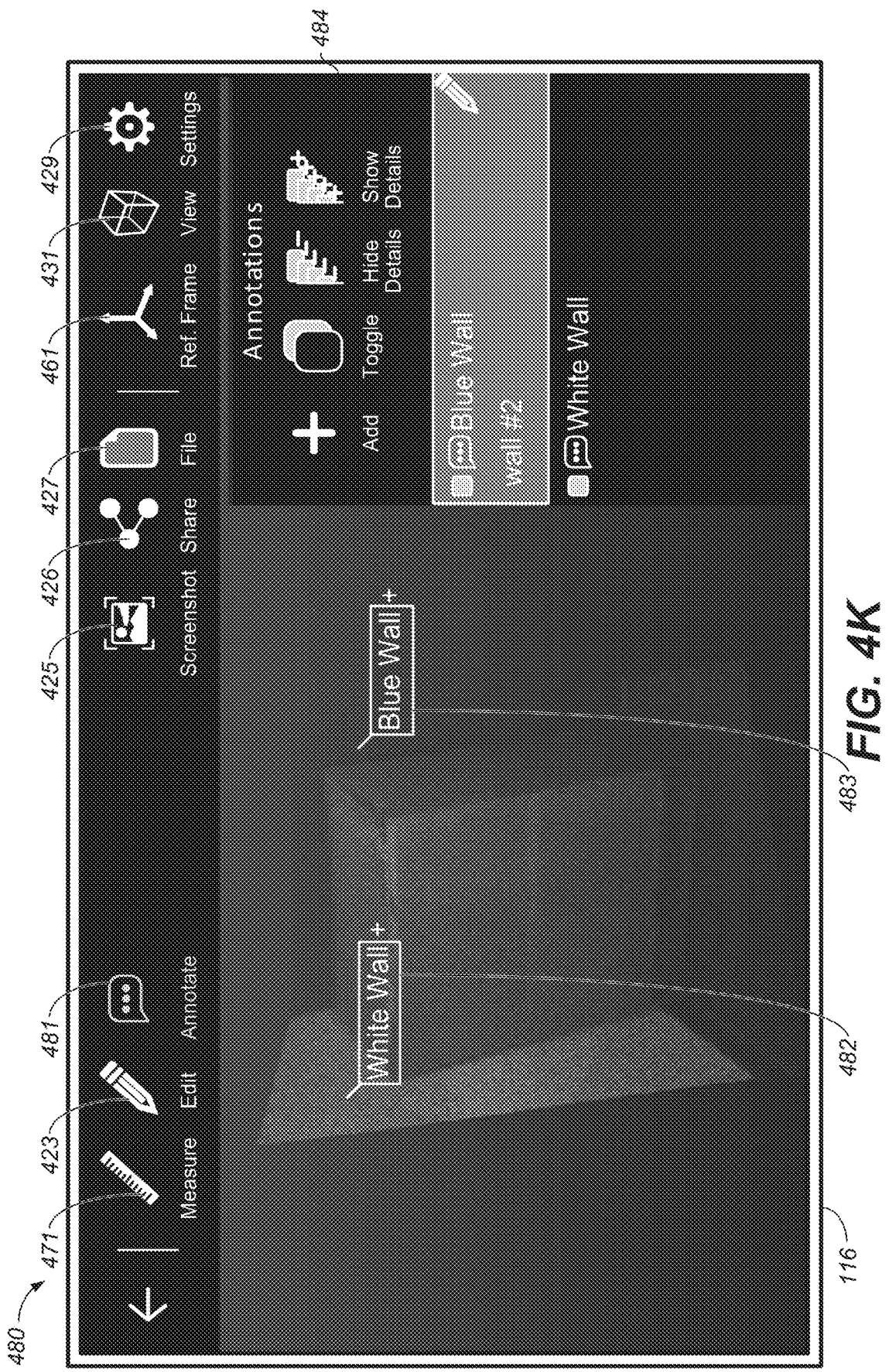
FIG. 4K is a screen shot of an optimized 3D scene with added annotation presented on the display screen in accordance with an embodiment.

Referring now to FIG. 4J, a screen shot 470 of an optimized 3D scene showing an in-scene measurement capability 474 is presented on the display 116 in accordance with an embodiment. In one embodiment, screen shot 470 is reached by selecting the measurement 471 icon from the top ribbon. After measurement 471 icon is selected, the use is able to take measurements from within the 3D scene.

In one embodiment, to take a measurement the user taps a first location 472 in the 3D scene. After first location 472 is selected, the user can tap (or select) a second location 473. Once both locations are selected, the measurement will be automatically determined. In general, the measurement capability 474 includes a total distance between the points as well as the change in the x, y, and z components in the currently active reference system. In one embodiment, the first location 472 and second location 473 are adjustable such as via dragging visual point selectors or the like.

At 333 of FIG. 3, the user determines whether they need any additional data regarding the contextual information in the rendered 3D scene. If they do not need any additional information, then the flowchart 300 is complete. If the user does need additional data, at 340 the user will re-select the contextual information.

Referring now to 350 it is determined if the contextual information is an embedded 2D image. If it is not a 2D image, then at 360 the contextual information (e.g., higher resolution video, sound recording, etc.) is presented on the screen or played as a sound and the flow chart loops back to 305.

However, if the contextual information is an embedded 2D image, then referring now to 353 of FIG. 3, the image is displayed in a zoomable and draggable view that allows annotation. At 355 the user decides if they want to annotate. If they do not want to annotate the image then they are finished.

If the user does want to annotate the 2D image, then at 358 the user annotates the image and the annotation point is added in global coordinates and becomes a contextual data item and the action is finished. For example, with reference now to FIG. 4K, a screen shot 480 of an optimized 3D scene with added annotation menu 484 presented on the display 116 is shown in accordance with an embodiment. In one embodiment, screen shot 480 is reached by selecting annotate 481 icon from the top ribbon. After annotate 481 icon is selected, the use is able to provide notes or the like into the 3D scene, such as annotation 482 and annotation 483. Although screen shot 480 shows the annotation of a 3D scene within a visualization of the 3D scene, it should be appreciated that the annotation mechanisms work regardless of whether the 3D scene is displayed using a virtual viewpoint (as in screen shot 480) from which the scene is rendered or whether the scene is displayed as a depth-mapped 2D image (as discussed in [0095]).

In one embodiment, to make an annotation in the 3D scene the user taps the add function in annotation menu 484. After add is selected, the user can hold a point within the 3D scene to bring up a magnifying window, and then drag to target a point in the scene once the user releases the point the annotation (e.g., annotation 482 and/or 483) can be placed. In one embodiment, the annotation can be written and is added via an onscreen keyboard, an actual keyboard, voice-to-text input, or the like. In one embodiment, the annotation can include a caption (e.g., title) and then additional detail information. For example, annotation 482 could be captioned "White Wall" and the additional detail information could include "painted, drywall, etc.". In one embodiment, only the caption of annotation 482 is shown in the 3D model and the additional detail information is provided when the annotation 482 is selected by the user.

In one embodiment, annotation can be added to the 3D model, to contextual information that is within the 3D model, etc. For example, if the 2D picture is a picture of a puddle from a leak, the 2D picture could be annotated. That annotation would be found within the 2D image data. When the 2D image is embedded within the 3D model, the annotated information from the 2D image would present as annotated information in the 3D model. That is, through the spatial embedding of the 2D pictures the 3D coordinates of the picked points (e.g., tags, annotations, measurements, etc.) can be inferred automatically.

In one embodiment, tags, annotations, measurements or other augmentations of the 3D scene are not only displayed as part of the 3D model rendering but also as part of the 2D picture display, enabled by the spatial embedding of the 2D pictures in the scene. In so doing, 3D points selected or annotated through one 2D picture not only become visible in the 3D model rendering but also become visible in all other 2D pictures that have direct visibility of the 3D point.

Thus, by embedding contextual information such as high-resolution 2D photos in a 3D model and giving the viewer of the 3D model the ability to seamlessly "fly" between different embedded 2D pictures in the scene solves the problem of regular 2D pictures lacking 3D visual context. In other words, the user is able to get and maintain a spatial understanding of where the pictures were taken and how they relate to each other in 3D.

Further, by presenting a zoomable and draggable 2D picture display interface for displaying the embedded 2D pictures, the user can work with a picture interface that's already familiar from other applications without losing the 3D context of the photo. Similarly, placing tags, annotations or measurements in the 3D model or performing any other operation that requires the user to pick points with a physical 3D meaning can be done through a familiar 2D picture interface. This solves the problem of plain 2D image collections not having depth information or any other kind of spatial relation to the captured scene. Moreover the 2D interface provides increased visual detail, a more familiar user interface, increased point picking precision as compared to selecting the points in a rendering of the 3D model in case a 3D model is available.

Moreover, giving a collection of contextual information a spatial embedding in a 3D model also solves the problem of annotation/tag visibility across different contextual information, without the user having to re-identify the same points across any number of different contextual information within the collection. The problem of communicating the 3D positions and orientations of additional rich scene information is also solved by augmenting and/or overlaying the rendering of a 3D model with abstractions (e.g. icons, symbols) of the embedded additional scene information.

In addition, letting the user tag/augment the 3D scene during capture using a visualization of the live capture process+crosshair provides a user-friendly alternative to tagging/augmenting the 3D scene post-capture (using an interface based on a rendering of the captured 3D model). Since the user is already present in the scene during capture and is controlling a capture device, singularizing a particular feature in the scene becomes as easy as shooting pictures with a digital camera. This is in contrast to augmenting the scene by operating with a full (often bulky) 3D model after capturing.

Figure 5:
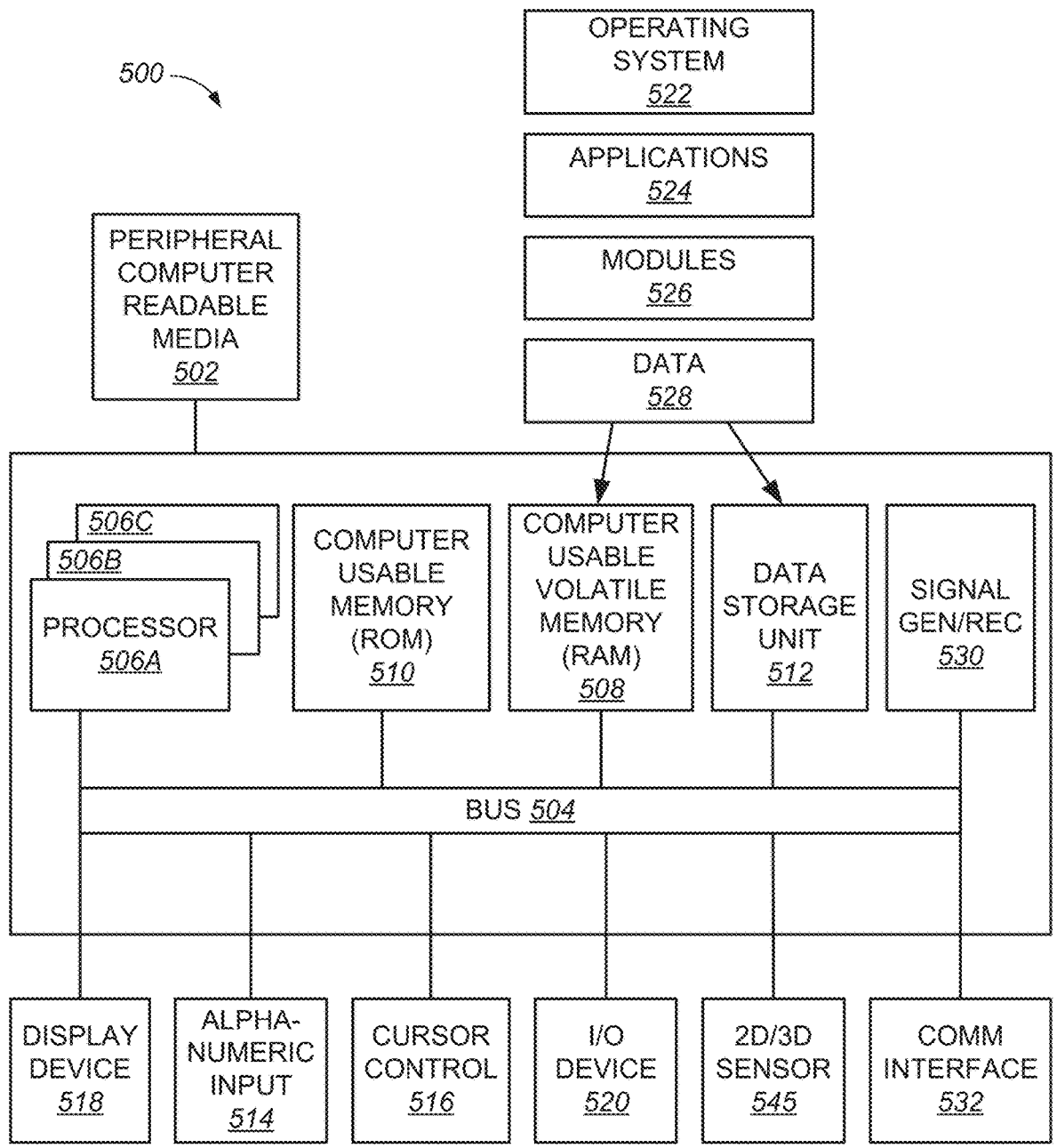
FIG. 5 is a block diagram of an example computer system with which or upon which various embodiments of the present invention may be implemented.

With reference now to FIG. 5, portions of the technology for providing a communication composed of computer-readable and computer-executable instructions that reside, for example, in non-transitory computer-readable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology such as mobile device 110. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic disk drive, optical disk drive, solid state drive (SSD), and the like) coupled to bus 504 for storing information and instructions. Computer system 500 also includes an optional alpha-numeric input device 514 including alphanumeric and function keys coupled to bus 504 for communicating information and command selections to processor 506A or processors 506A, 506B, and 506C. Computer system 500 also includes an optional cursor control device 516 coupled to bus 504 for communicating user input information and command selections to processor 506A or processors 506A, 506B, and 506C. Optional cursor control device may be a touch sensor, gesture recognition device, and the like. Computer system 500 of the present embodiment also includes an optional display device 518 coupled to bus 504 for displaying information.

Referring still to FIG. 5, optional display device 518 of FIG. 5 may be a liquid crystal device, cathode ray tube, OLED, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. Computer system 500 also includes an I/O device 520 for coupling system 500 with external entities. For example, in one embodiment, I/O device 520 is a modem for enabling wired or wireless communications between system 500 and an external network such as, but not limited to, the Internet or intranet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

System 500 also includes one or more 2D and/or 3D sensor input(s) 545 coupled with bus 504 for enabling system 500 to capture 2D and/or 3D information from sensors attached to system 500 and/or other electronic devices and computer systems. 2D and/or 3D sensor input(s) 545 of the present embodiment may include 2D and/or 3D audio, video, and/or still capture technology such as (or similar to) that described in FIGS. 1-4K herein or their equivalents.

The computing system 500 is only one example of a suitable computing environment and is not intended to suggest any limitation as to the scope of use or functionality of the present technology. Neither should the computing environment be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:
1. An assembly comprising:
   a 3D capture device to capture 3D imagery at a first resolution; and
   a mobile computing device coupled to the 3D capture device, the mobile computing device comprising:
     a memory;
     a contextual information capturing device, the contextual information capturing device to capture at least one piece of contextual information,
       the at least one piece of contextual information including a capture location data and a pose data of the at least one piece of contextual information at a time of capture;
     a processor, the processor to:
       receive the 3D imagery from the 3D capture device;
       render a 3D model using the 3D imagery;
       utilize the capture location data and the pose data to embed the at least one piece of contextual information into an appropriate location in the 3D model;
       determine a plurality of keyframes from the 3D imagery;
       discard any frames in the 3D imagery that are not keyframes; and render the 3D model with only the plurality of keyframes to reduce a file size and a processing requirement for the render of the 3D model; and
an interactive display, the interactive display to present a user interactive version of the 3D model including the embedded at least one piece of contextual information.

2. The assembly of claim 1 where the 3D model is rendered in real-time or near real-time.

3. The assembly of claim 1 where the processor is further to:
tie the at least one piece of contextual information to a best keyframe of the plurality of keyframes,
the best keyframe being selected from the plurality of keyframes using a metric comprising:
a distance of a keyframe optical center position to a pose position of the one piece of contextual information;
an angular difference between a keyframe orientation and a pose orientation of the one piece of contextual information; and
a 3D coordinates of a capture location data of the one piece of contextual information as seen from a viewpoint of the keyframe.

4. The assembly of claim 1 wherein the contextual information capturing device is a 2D camera, and the at least one piece of contextual information is a 2D image having a second resolution equal to or higher than the first resolution.

5. The assembly of claim 4 where the processor is further to:
map, based on a spatial embed of the 2D image into the 3D model, any dimensional data from the 3D model that falls within a scope of the 2D image into the 2D image to generate a point-mapped 2D image,
the point mapping allowing the dimensional data to be available when the 2D image is presented independently of the 3D model.

6. The assembly of claim 1 wherein the contextual information capturing device is a 2D video camera, and the at least one piece of contextual information is a 2D video snippet having a second resolution.

7. The assembly of claim 1 wherein the contextual information capturing device is a sound recorder and the at least one piece of contextual information is an audio snippet represented as a digitized waveform.

8. A method, comprising:
capturing, with a 3D capture device, a plurality of 3D images at a first resolution;
capturing, with a component on a mobile computing device, at least one piece of contextual information,
the at least one piece of contextual information including a capture location data and a pose data of the at least one piece of contextual information at a time of capture;
receiving, and storing in a memory of the mobile computing device, the plurality of 3D images from the 3D capture device;
rendering, via a processor of the mobile computing device, the plurality of 3D images into a 3D model, wherein the rendering further comprises:
determining a plurality of keyframes from the plurality of 3D images;
discarding any of the plurality of 3D images that are not keyframes; and
rendering the 3D model with only the plurality of keyframes, to reduce a file size, a processing requirement, and a memory requirement for the rendering of the 3D model;
embedding, via the processor and using the capture location data and the pose data, the at least one piece of contextual information into a correct location in the 3D model; and
presenting, via an interactive display of the mobile computing device, a user interactive version of the 3D model, the user interactive version of the 3D model including the embedded at least one piece of contextual information.

9. The method of claim 8 further comprising:
linking the at least one piece of contextual information to a best keyframe of the plurality of keyframes,
the best keyframe being selected from the plurality of keyframes using a metric comprising:
a distance of a keyframe optical center position to a pose position of the one piece of contextual information;
an angular difference between a keyframe orientation and a pose orientation of the one piece of contextual information; and
a 3D coordinates of a capture location data of the one piece of contextual information as seen from a viewpoint of the keyframe.

10. The method of claim 8 wherein the embedding of the at least one piece of contextual information into a correct location in the 3D model comprises:
displaying an icon spatially embedded in the 3D model representing the at least one piece of contextual information, the icon in the correct location; and
utilizing the pose data for the at least one piece of contextual information to orient the icon in the 3D model into a correct as taken orientation.

11. The method of claim 8 wherein the component is selected from the group consisting of:
a 2D camera, and the at least one piece of contextual information is a 2D image having a second resolution equal to or higher than the first resolution,
a 2D video camera and the at least one piece of contextual information is a 2D video snippet having a third resolution equal to or higher than the first resolution, and
a sound recorder and the at least one piece of contextual information is an audio snippet represented as a digitized waveform.

12. The method of claim 11 further comprising:
mapping, based on a spatial embedding of the 2D image into the 3D model, any dimensional data from the 3D model that falls within a scope of the 2D image into the 2D image to generate a point-mapped 2D image,
the point-mapped 2D image allowing the dimensional data to be available when the 2D image is presented independently of the 3D model.

13. The method of claim 8 further comprising:
adding an annotation to the user interactive version of the 3D model.

14. The method of claim 8 further comprising:
tagging at least one point in the user interactive version of the 3D model, wherein the tagging is used for an action from the group consisting of:
identifying a point of importance,
adding a voice-note to a point,
geometrically linking a plurality of points to establish a geometric constraint that can be used in a global 3D model optimization process wherein a 3D model accuracy and appearance is improved according to a configurable criteria, and measuring a distance from a first point in the user interactive version of the 3D model to a second point in the user interactive version of the 3D model.

15. The method of claim 8 further comprising:
automatically capturing, with the component on the mobile computing device, the at least one piece of contextual information.

16. A mobile computing device comprising:
a memory;
a 3D capture device to capture 3D imagery at a first resolution;
a contextual information capturing device to capture a plurality of pieces of contextual information,
  each of the plurality of pieces of contextual information including a capture location data and a pose data of the at least one piece of contextual information at a time of capture;
one or more processors, the one or more processors to:
  determine a plurality of keyframes from the 3D imagery;
  discard any frames in the 3D imagery that are not keyframes;
  render a 3D scene with only the plurality of keyframes to reduce a file size, a processing requirement, and a memory requirement for the render of the 3D scene;
  utilize the capture location data and the pose data to embed each of the plurality of pieces of contextual information into a correct location in the 3D scene; and
an interactive display to present a user interactive version of the 3D scene, the user interactive version of the 3D scene including the embedded plurality of pieces of contextual information.

17. The mobile computing device of claim 16, wherein the contextual information capturing device is a 2D camera, the plurality of pieces of contextual information are 2D images having a second resolution equal to or higher than the first resolution, and where the one or more processors are further to:
  map, based on a spatial embed of the 2D images into the 3D scene, any dimensional data from the 3D scene that falls within a scope of each of the 2D images into each of the 2D images to generate a plurality of point-mapped 2D images,
  the plurality of point-mapped 2D images allowing the dimensional data to be available when one or more of the plurality of point-mapped 2D images are presented independently of the 3D scene.

18. The mobile computing device of claim 16, where the one or more processors are further to:
  tag at least one point in the user interactive version of the 3D scene, wherein the tag is used to perform an action from the group consisting of:
    an identification of a point of importance in the 3D scene,
    an addition of a voice-note to the at least one point,
    a geometric link for a plurality of points to establish a geometric constraint that can be used in a global 3D scene optimization process wherein a 3D scene accuracy and appearance is improved according to a configurable criteria, and
    a measurement of a distance from a first point in the user interactive version of the 3D scene to a second point in the user interactive version of the 3D scene.

* * * * *